United States Patent
Sharma et al.

(10) Patent No.: US 12,453,558 B2
(45) Date of Patent: Oct. 28, 2025

(54) LAPAROSCOPIC ANASTOMOSIS DEVICES AND METHODS OF USE THEREOF

(71) Applicant: Vivifi Medical, Inc., Houston, TX (US)

(72) Inventors: Tushar Sharma, Manvel, TX (US); Frida Montoya, Pearland, TX (US); Nicolo Garbin, Houston, TX (US)

(73) Assignee: Vivifi Medical, Inc., Houston, TX (US)

( * ) Notice: Subject to any disclaimer, the term of this patent is extended or adjusted under 35 U.S.C. 154(b) by 0 days.

(21) Appl. No.: 19/064,641

(22) Filed: Feb. 26, 2025

(65) Prior Publication Data

US 2025/0213252 A1    Jul. 3, 2025

Related U.S. Application Data

(63) Continuation of application No. PCT/US2023/074915, filed on Sep. 22, 2023.

(60) Provisional application No. 63/409,115, filed on Sep. 22, 2022.

(51) Int. Cl.
A61B 17/115 (2006.01)

(52) U.S. Cl.
CPC ..... *A61B 17/115* (2013.01); *A61B 2017/1157* (2013.01)

(58) Field of Classification Search
CPC .... A61B 2017/1132; A61B 2017/1103; A61B 2017/1107; A61B 2017/1139; A61B 2017/1125; A61B 2017/00477; A61B 2017/00252; A61B 17/11;

(Continued)

(56) References Cited

U.S. PATENT DOCUMENTS

| 3,048,177 A | 8/1962 | Timothy et al. |
| 3,316,914 A | 5/1967 | Collito |
| 4,245,638 A | 1/1981 | Lebeck et al. |

(Continued)

FOREIGN PATENT DOCUMENTS

| EP | 1299145 B1 | 9/2007 |
| EP | 1983907 B1 | 5/2015 |

(Continued)

OTHER PUBLICATIONS

Extended European Search Report for European Application No. 20894105.4 dated Nov. 29, 2023, 9 pages.

(Continued)

*Primary Examiner* — Mohamed G Gabr
(74) *Attorney, Agent, or Firm* — COOLEY LLP

(57) ABSTRACT

An apparatus includes an elongate body and an end effector coupled to a distal end the elongate body. The end effector includes a first end effector element configured to hold a first coupler element, a second end effector element configured to hold a second coupler element of the, and first and second end effector elements coupling first and second end effector elements to the elongate body. The end effector is configured to move between a first configuration in which the first and second end effector elements are located in a first position in which axial end of first vessel is coupled to first coupler element, a second position in which axial end of second vessel is coupled to second coupler element, and a third configuration in which first and second end effectors close to coupler the coupler elements and anastomose the first and second vessel.

37 Claims, 33 Drawing Sheets

(58) Field of Classification Search
CPC ........ A61B 17/12045; A61B 17/12109; A61B 17/115; A61B 17/00234; A61B 17/12136; A61B 1/3137
See application file for complete search history.

(56) References Cited

U.S. PATENT DOCUMENTS

| | | | |
|---|---|---|---|
| 6,464,665 | B1 | 10/2002 | Heuser |
| 6,475,226 | B1 | 11/2002 | Belef et al. |
| 8,109,427 | B2 | 2/2012 | Orban, III |
| 2005/0251179 | A1 | 11/2005 | Vargas |
| 2009/0182360 | A1 | 7/2009 | Makower |
| 2010/0268076 | A1 | 10/2010 | Gat et al. |
| 2011/0220703 | A1* | 9/2011 | Orban, III ......... A61B 17/1152 227/179.1 |
| 2011/0251628 | A1 | 10/2011 | Kim et al. |
| 2011/0319916 | A1 | 12/2011 | Kim et al. |
| 2013/0204275 | A1* | 8/2013 | Agarwal ................ A61B 17/11 606/139 |
| 2014/0155879 | A1 | 6/2014 | McRae et al. |
| 2015/0088172 | A1* | 3/2015 | Watanabe .............. A61B 17/11 606/155 |
| 2018/0235639 | A1 | 8/2018 | DeMeritt |
| 2019/0275293 | A1 | 9/2019 | Lenihan et al. |
| 2020/0178966 | A1 | 6/2020 | Lou et al. |
| 2021/0401435 | A1 | 12/2021 | Chiruvolu et al. |
| 2023/0078647 | A1 | 3/2023 | Sharma et al. |
| 2024/0032928 | A1 | 2/2024 | Sharma |

FOREIGN PATENT DOCUMENTS

| | | |
|---|---|---|
| JP | 2016508833 A | 3/2016 |
| WO | WO-2018236835 A1 | 12/2018 |
| WO | WO-2021108600 A1 | 6/2021 |
| WO | WO-2022204160 A1 | 9/2022 |
| WO | WO-2024064899 A2 | 3/2024 |

OTHER PUBLICATIONS

Extended European Search Report for European Application No. 22776484.2 mailed Dec. 9, 2024, 12 pages.
International Preliminary Report on Patentability for International Application No. PCT/US2022/021363 dated Oct. 5, 2023, 19 pages.
International Search Report and Written Opinion for International Application No. PCT/US2020/062287, mailed Mar. 25, 2021, 13 pages.
International Search Report and Written Opinion for International Application No. PCT/US2022/021363, mailed Jun. 22, 2022, 20 pages.
Office Action for Japanese Application No. 2022-530986 mailed Aug. 1, 2024, with English translation, 12 pages.
International Search Report and Written Opinion for International Application No. PCT/US2023/074915 dated Apr. 8, 2024, 9 pages.

* cited by examiner

200

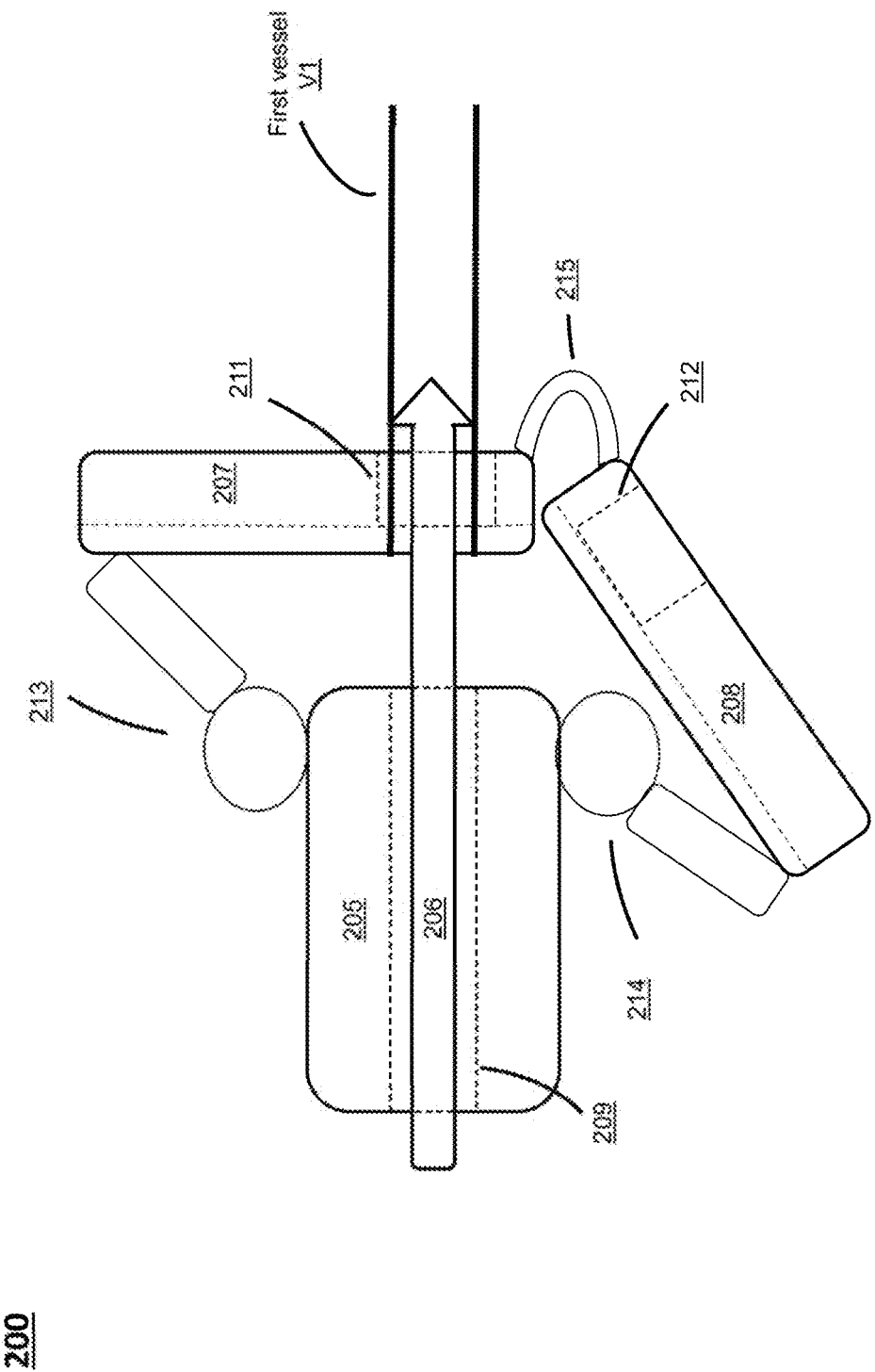

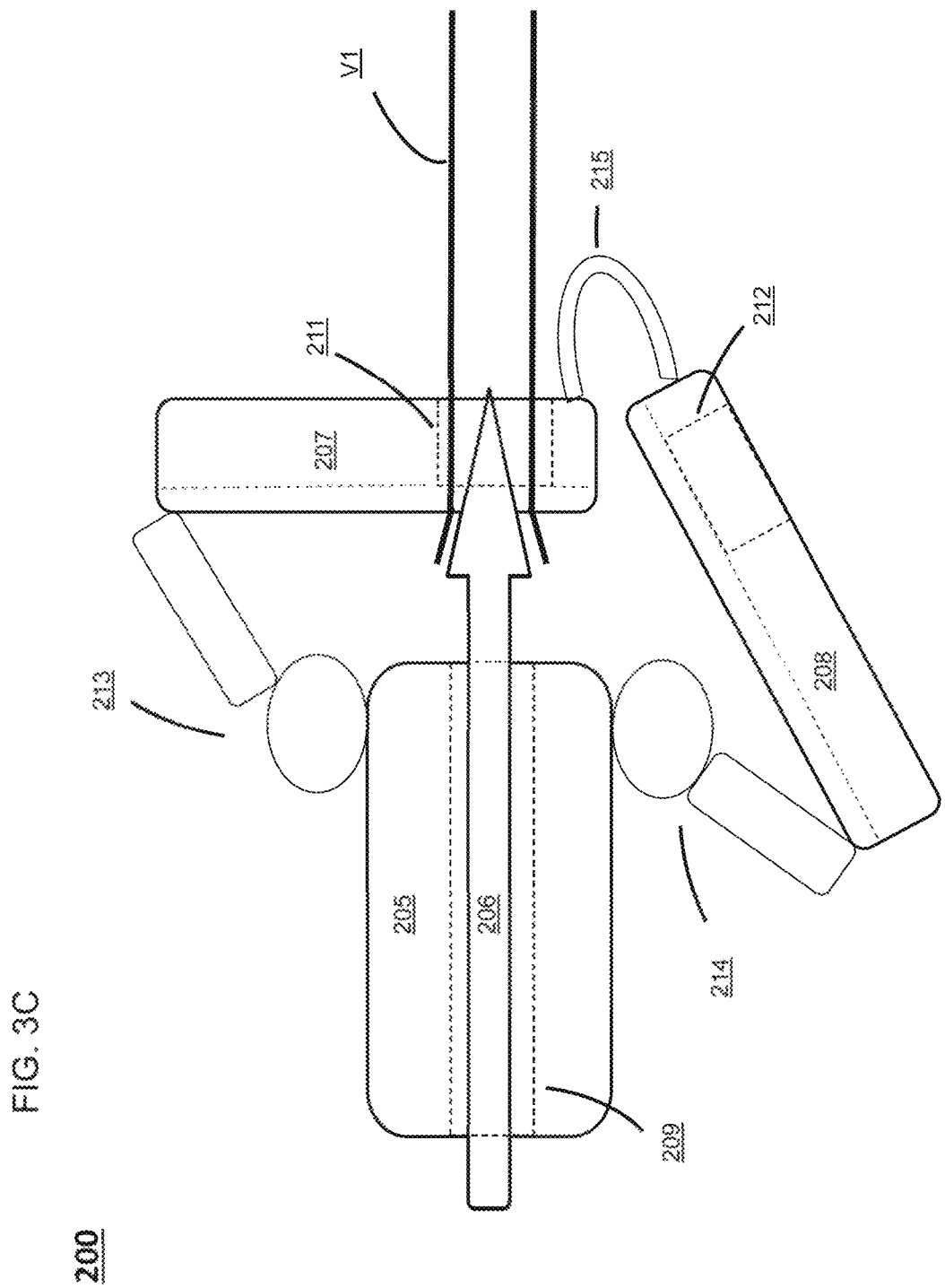

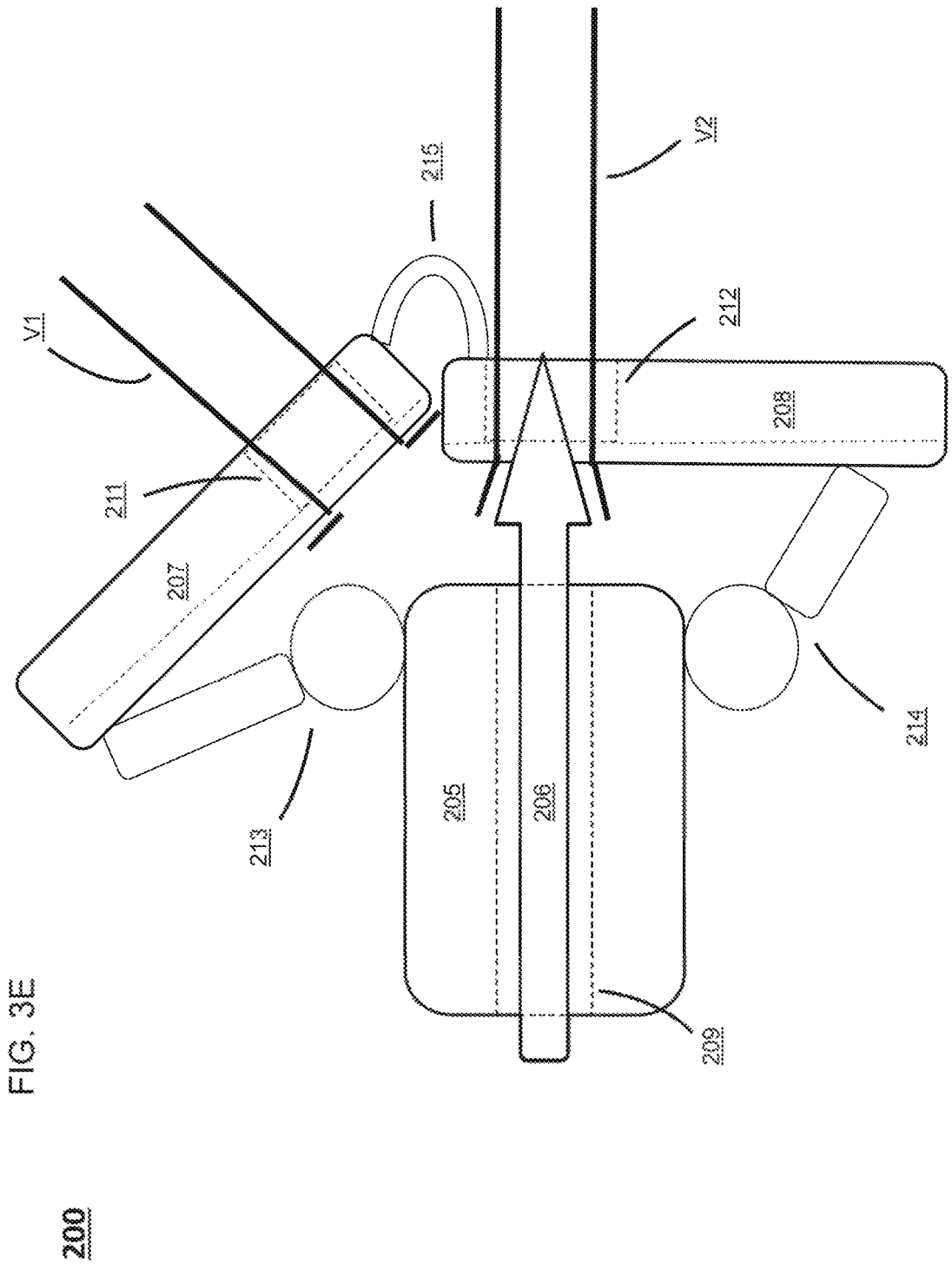

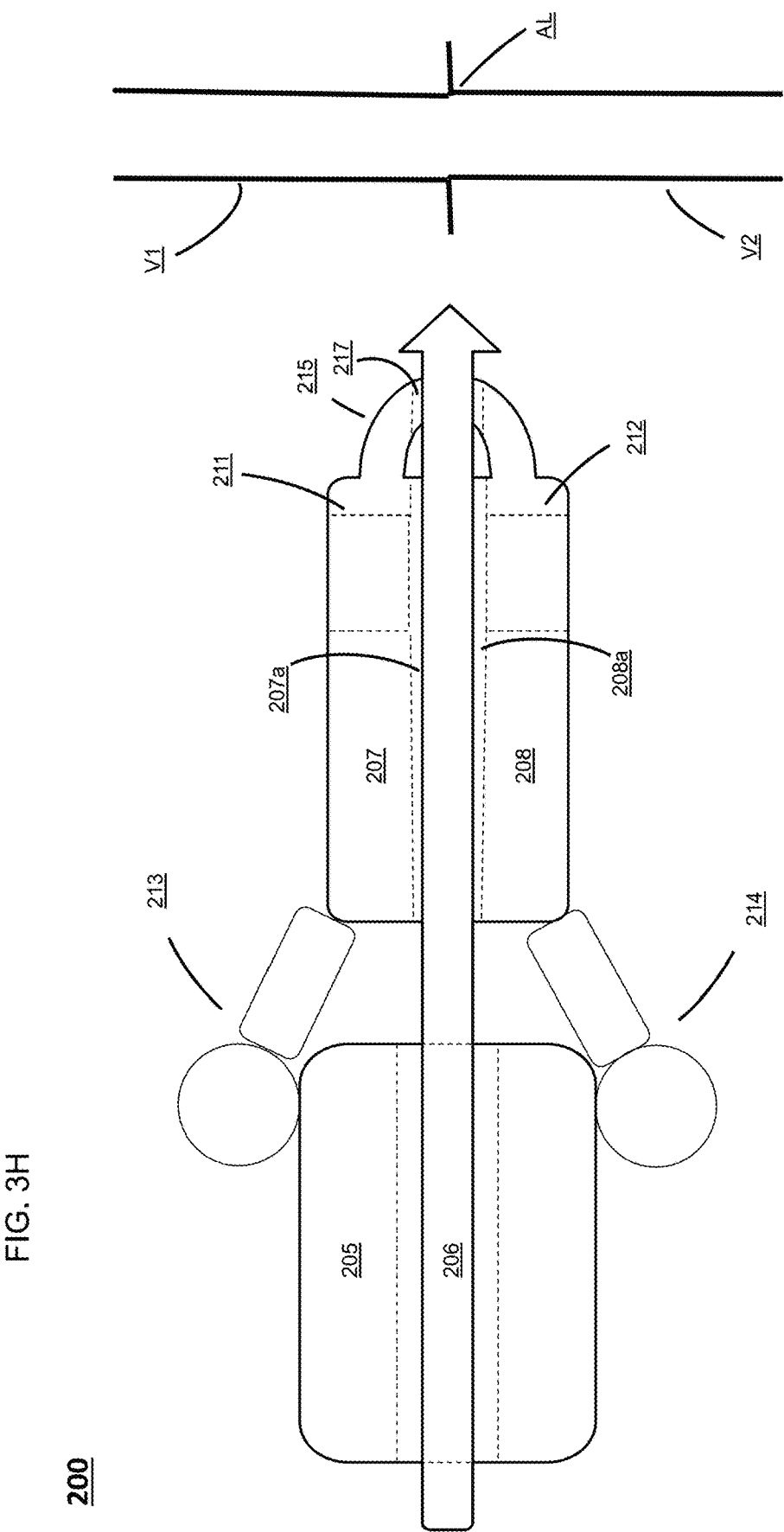

300

300

300

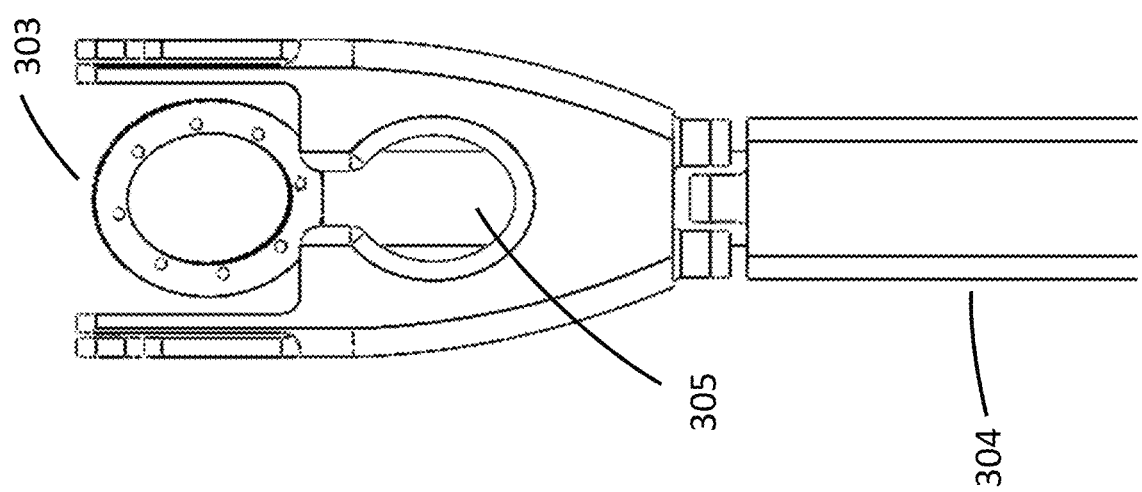

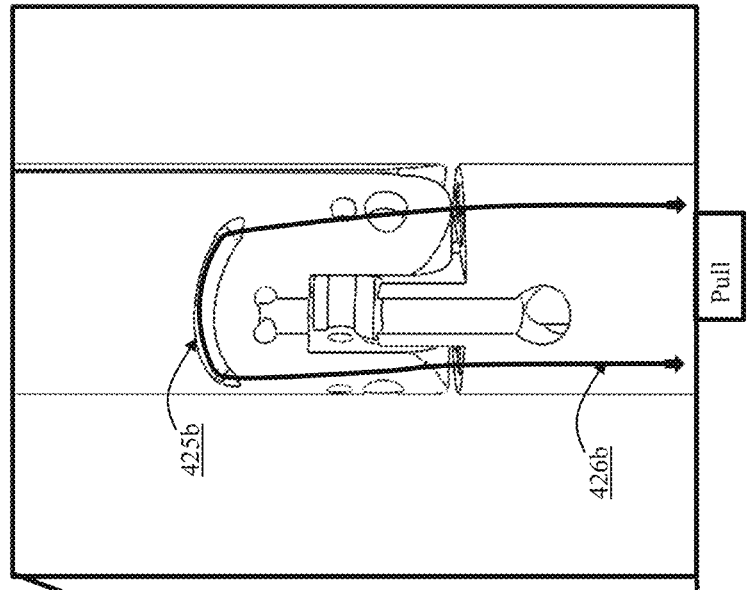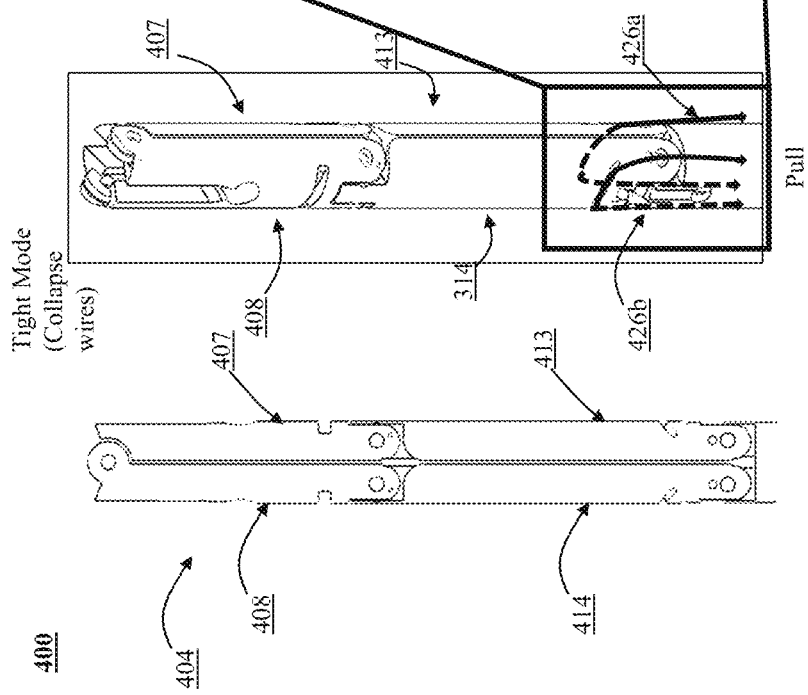

LAPAROSCOPIC ANASTOMOSIS DEVICES AND METHODS OF USE THEREOF

CROSS-REFERENCE TO RELATED APPLICATIONS

This application is a Continuation of International Patent Application No. PCT/US2023/074915, filed Sep. 22, 2023, which claims priority to and benefit of U.S. Provisional Application No. 63/409,115, filed Sep. 22, 2022, and entitled "Laparoscopic Anastomosis Devices and Methods of Use Thereof," the entire disclosures of which are hereby incorporated by reference herein.

STATEMENT OF GOVERNMENT SUPPORT

This invention was made with government support under Contract No. 2026272 awarded by the National Science Foundation. The government has certain rights in the invention.

TECHNICAL FIELD

The embodiments described herein relate generally to apparatus for laparoscopically performing anastomosis of two tubular structures.

BACKGROUND

An anastomosis is a connection between two luminal structures. Commonly, anastomotic connections are surgically created on blood vessels (such as veins or arteries), or tubular gastrointestinal structures (such as the intestines). Conventional techniques allow the anastomosis to be completed between two ends (referred to as end-to-end anastomosis), or between the end of one structure and the side of another structure (referred to as end-to-side anastomosis). Procedures requiring these anastomoses are carried out thousands of times per day, globally. Likewise, multiple surgical specialties rely upon the creation of reliable, unobstructed anastomoses for successful treatment of their respective patients. The surgical reattachment of veins and arteries (occasionally referred to herein for the sake of brevity as anastomosis) helps to restore blood circulation, and consequently, improves the supply of oxygen and other nutrients to downstream tissues as well as improve the return of deoxygenated blood from tissues back into the circulatory system. Thus, it is desirable to perform various vessel anastomosis procedures reliably using minimally invasive procedures and with reduced complexity.

SUMMARY

Embodiments described herein relate to microsurgical instruments, minimally invasive surgery, and laparoscopic surgical devices. More specifically, embodiments described herein relate to systems, methods, and devices for performing anastomosis of tubular structures via a minimally invasive or laparoscopic surgical approach. Embodiments described herein additionally relate to laparoscopic systems, methods, and devices intended for use in conjunction with joinable rings or other anastomotic couplers used in microvascular anastomosis to facilitate the end-to-end or end-to-side coaptation of vascular structures (such as arteries and/or veins).

In some embodiments, an apparatus includes: an elongate body; and an end effector coupled to a distal end of the elongate body, the end effector including: a first end effector element defining a first receptacle configured to hold a first coupler element of a coupler, a first articulating member coupling a proximal end of the first end effector element to the elongate body, a second end effector element defining a second receptacle configured to hold a second coupler element of the coupler, a second articulating member coupling a proximal end of the second end effector element to the elongate body, and wherein the end effector is configured to move between: (i) a first configuration in which the first and second articulating members dispose the first and second end effector elements to allow a first axial end of a first vessel to be received into the first coupler element; (ii) a second configuration different from the first configuration in which the first and second articulating members dispose the first and second end effector to allow a second axial end of a second vessel to be received into the second coupler element; and (iii) a third configuration in which the first and second articulating members dispose at least a portion of the first end effector element proximate to a corresponding portion of the second end effector element such that the first coupler element is coupled to the second coupler elements to couple the first vessel to the second vessel.

In some embodiments, an apparatus includes: a first end effector element defining a first receptacle configured to hold a first coupler element of a coupler; a first articulating member coupling a proximal end of the first end effector element to an elongate body; a second end effector element defining a second receptacle configured to hold a second coupler element of the coupler, a distal end of the second end effector element coupled to a distal end of the first end effector element such that the first and second effector elements can articulate about their respective distal ends; and a second articulating member coupling a proximal end of the second end effector element to the elongate body, wherein the end effector is configured to move between: (i) a first configuration in which the first and second articulating members dispose the first and second end effector elements to allow a first axial end of a first vessel to be received into the first coupler element; (ii) a second configuration different from the first configuration in which the first and second articulating members dispose the first and second end effector to allow a second axial end of a second vessel to be received into the second coupler element; and (iii) a third configuration in which the first and second articulating members dispose at least a portion of the first end effector element proximate to a corresponding portion of the second end effector element such that the first coupler element is coupled to the second coupler elements to couple the first vessel to the second vessel.

In some embodiments, a method for anastomosis of a first vessel with a second vessel within a body of a patient, includes: inserting a distal end of an elongate body of an apparatus into the body of the patient, an end effector coupled to the distal end of the elongate body, the end effector including a first end effector element coupled to the elongate body via a first articulating member, and a second end effector element coupled to the elongate body via a second articulating member. A second coupler element of the coupler is disposed into a second receptacle of the second end effector element. A distal end of the elongate body is inserted into the body of the patient. The end effector is moved into a first configuration in which at least a portion of the first end effector is nearly perpendicular to the axis of the elongate body. An axial end of the first vessel is inserted through the first coupler element. The end effector is moved into a second configuration in which at least a portion of the second end effector element is nearly perpendicular to the axis of the elongate body. An axial end of the second vessel is inserted through second coupler element. The end effector is moved into a third configuration to cause at least the portion of the first end effector element to move proximate to the corresponding portion of the second end effector element to couple the first coupler element to the second coupler element, thereby coupling the first vessel to the second vessel. The first coupler element is released from the first end effector element and the second coupler element from the second end effector element.

In some embodiments, a method for anastomosis includes: transitioning, after an end effector of an anastomosis device has been positioned into a body of a patient, the end effector to a first configuration; receiving, when the end effector is in the first configuration, an axial end of a first vessel through a first coupler element mounted to a first portion of the end effector; transitioning the end effector to a second configuration different from the first configuration; receiving, when the end effector is in the second configuration, an axial end of a second vessel through a second coupler element mounted to a second portion of the end effector; transitioning the end effector into a third configuration in which at least the first portion of the end effector is positioned proximate to the second portion of the end effector to couple the first coupler element to the second coupler element, thereby coupling the first vessel to the second vessel; and releasing the first and second coupler elements from the end effector.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 3A-3H are schematic illustrations of various steps of a method for coupling first vessel to a second vessel using an anastomosis apparatus, according to an embodiment.

FIGS. 4A-4F are various perspective views of an anastomosis apparatus showing various steps for coupling first vessel to a second vessel, according to an embodiment.

FIGS. 7A and 76B are illustrations of first actuators for moving end effector elements of the apparatus of FIG. 6 into a partially open position (FIG. 7A) and a fully open position (FIG. 7B), according to an embodiment.

FIGS. 9B-9D show the end effector of the apparatus of FIG. 6 in the closed configuration facilitated by the third actuators.

Figure 1A:
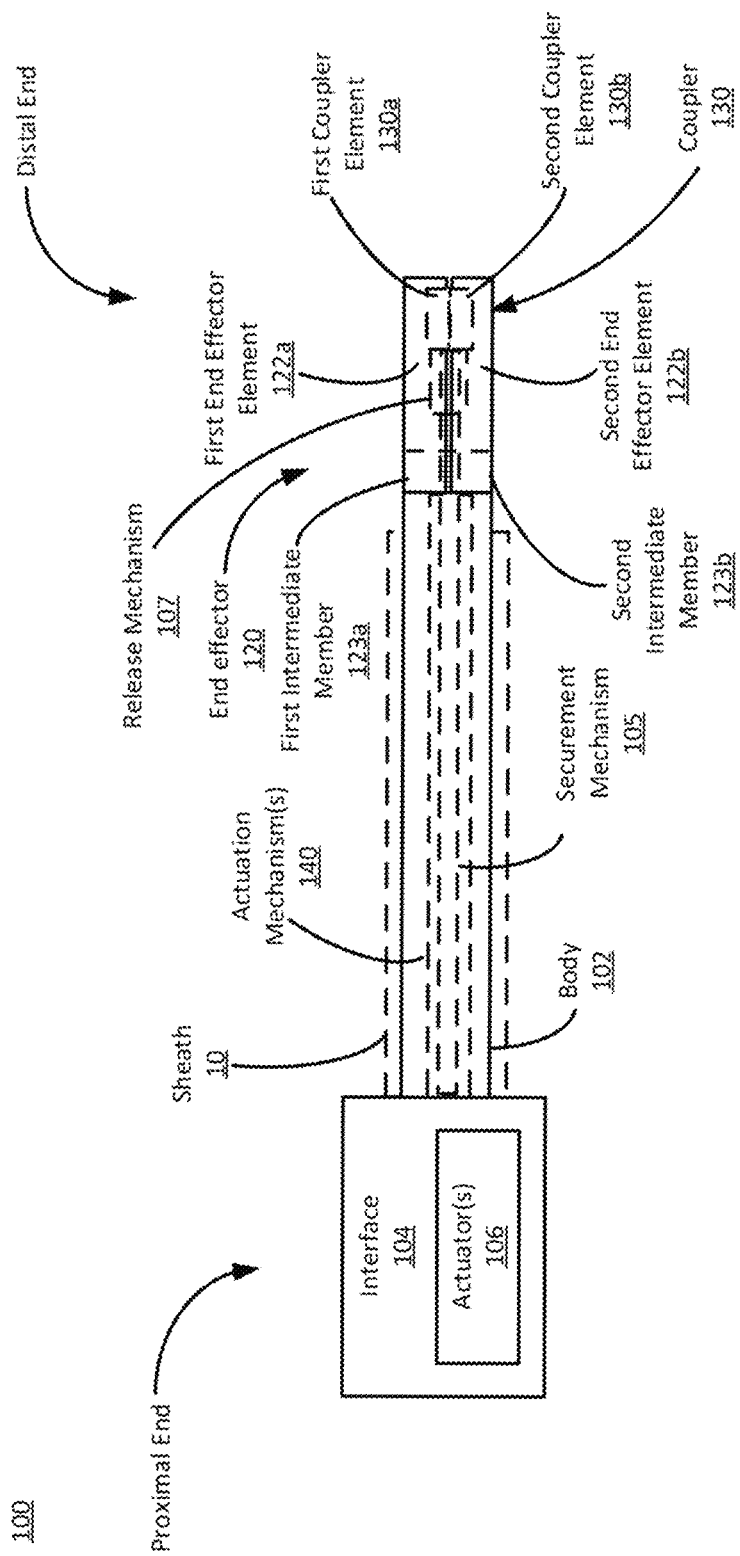
FIG. 1A is a schematic illustration of an apparatus for performing laparoscopic anastomosis of two vessels.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate to microsurgical instruments, minimally invasive surgery, and laparoscopic surgical devices. More specifically, embodiments described herein relate to systems, methods, and devices for performing anastomosis of tubular structures via a minimally invasive or laparoscopic surgical approach. Embodiments described herein additionally relate to laparoscopic systems, methods, and devices intended for use in-conjunction with joinable rings or other anastomotic couplers used in microvascular anastomosis to facilitate the end-to-end coaptation of vascular structures (such as arteries and/or veins).

An anastomosis is a connection between two luminal structures. Commonly, anastomotic connections are surgically created on blood vessels (such as veins or arteries), or tubular gastrointestinal structures (such as the intestines). Conventional techniques allow the anastomosis to be completed between two ends (referred to as end-to-end anastomosis), or between the end of one structure and the side of another structure (referred to as end-to-side anastomosis).

Procedures requiring these anastomoses are carried out thousands of times per day, globally. Likewise, multiple surgical specialties rely upon the creation of reliable, unobstructed anastomoses for successful treatment of their respective patients. The surgical reattachment of veins can help to restore blood circulation, and consequently, improves the supply of oxygen and other nutrients to downstream tissues as well as improve the return of deoxygenated blood from tissues back into the circulatory system. It is desirable to perform various vessel anastomosis procedures using minimally invasive procedures and with reduced complexity.

The original technique for performing an anastomosis was created by Alexis Carrel, who was later awarded the Nobel Prize in 1912 for his pioneering work. Despite 110 years of surgical evolution and innovation since the development of microsurgical anastomosis, the majority of vascular anastomoses to this day still employ suture techniques similar to Carrel's initial description in the early 1900s. In the 1970s, gastrointestinal stapling devices were introduced, which quickly replaced primary suture techniques for bowel anastomoses. However, most surgeons still employ circumferential suture techniques in the serosal layer overlying the stapled anastomosis for added support. Although generally successful, these techniques can take long periods of time, often require additional surgical expertise, and if not performed correctly, may result in leakage (blood, stool contents, gastric contents, lymphatic fluid, etc.), constriction, stenosis, and/or obstruction at the anastomotic site. In the case of vascular anastomoses, stenosis and/or obstruction can result in catastrophic complications such as heart attack, stroke, peripheral limb ischemia, amputation, death, and reconstructive failure and soft-tissue loss.

With the understood importance of reliable, open anastomoses, microvascular anastomotic couplers can provide superior alternatives to sutures and staples. Microvascular anastomotic couplers can consist of two coupler circular rings, each with a tissue-engaging surface including a multitude of sharp spikes. A blood vessel is brought through the center of each ring and the vessel wall is everted, or rolled over, the tissue spikes for securement. This is completed on each vessel end, and the two rings are then brought together with the spikes/pins being forced into the opposite ring to join the ends together.

Microvascular anastomosis of blood vessels can be accomplished using a micro anastomotic coupling device, such as the GEM™ FLOW COUPLER device. Current anastomotic couplers, however, are not designed or easily adaptable for use in minimally invasive procedures such as laparoscopy or microsurgery due to poor visibility and tight operating spaces as well as the lack of a device for applying two anastomotic couplers together that can be introduced through the small diameter of a trocar port.

Due to the lack of a reliable device or technique to apply anastomotic couplers laparoscopically, manual suturing is predominantly used for surgical coaptation of blood vessels in minimally invasive procedures. Manual suturing of blood vessels can be quite challenging, primarily due to the small size of the vessels and the minimal working space. Since most vessels are only 1 to 8 mm in diameter, the procedure generally includes the use of a surgical microscope. The sutures are about 70 μm thick and can be difficult to handle. As a result, surgeons and surgical residents must undergo extensive additional training prior to operating on a patient in need of tissue transfer. Moreover, surgeons attempt to limit the recipient site morbidity resulting in small incisions and small areas within which to work. For instance, in microsurgical postmastectomy breast reconstruction, the surgeon will typically be working in a 2.5 cm to 3 cm surgical field. These size constraints make it difficult for surgeons to maneuver their surgical instruments. Arterial anastomosis performed by manual suturing take approximately 23.5 minutes in the operating room, which is undesirable.

In contrast, embodiments of the anastomosis apparatus and methods of use described herein may provide one or more benefits, including, for example: 1) allowing minimally invasive laparoscopic surgery for performing anastomosis of two tubular tissues, for example, vessels, nerves, etc., through a small incision having a diameter of less than about 25 mm; 2) enabling anastomosis by simple clamping of coupler elements via an end effector that includes a pair of end effector elements configured to separate or close to couple the coupler elements, allowing anastomosis of two vessels within a time of about 5 minutes or less; 4) enabling articulation of the end effector about a longitudinal axis to provide surgical flexibility and allowing the end effector to access hard to reach areas; 5) providing an elongate body to which the end effector is coupled, which may have a length greater than about 8 inches allowing insertion through an incision in an abdominal wall or other portion of a user's body, while still allowing anastomosis of vessels in the pelvic floor of a patient; 6) providing a multi-functional interface that allows performing of all anastomosis related operations from the interface, thus reducing the use of manual handling with tweezers; 7) providing a vessel end actuator that facilitates quick and easy coupling of the blood vessel ends to the coupling rings, thereby reducing the time and technical skill needed to perform the procedure, and 8) providing significant clinical applicability, utility, and novelty in various surgical procedures for the treatment of numerous pathophysiological disorders, urological conditions, chronic diseases, and clinical indications including, but not limited to, varicocele repair, cardiovascular surgery, varicocele, erectile dysfunction, testosterone deficiency (hypogonadism), infertility, nutcracker syndrome, benign prostate hyperplasia (BPH), testicular pain, testicular atrophy, testicular cancer, bladder cancer, prostate cancer, pelvic congestion, pelvic congestion syndrome, pelvic pain, ovarian cancer, polycystic ovarian syndrome, endometriosis, and/or uterine fibroids.

In some embodiments, any of the systems, methods, and devices described herein may be used to treat an indication including BPH. In some embodiments, any of the systems, methods, and devices described herein may be used to treat an indication including prostate cancer. In some embodiments, any of the systems, methods, and devices described herein may be used to treat an indication including male infertility. In some embodiments, any of the systems, methods, and devices described herein may be used to treat an indication including androgen deprivation therapy. In some embodiments, any of the systems, methods, and devices described herein may be used to treat an indication including uterine fibroids. In some embodiments, any of the systems, methods, and devices described herein may be used to treat an indication including endometriosis. In some embodiments, any of the systems, methods, and devices described herein may be used to treat an indication including polycystic ovarian syndrome.

Various embodiments of systems, methods, and devices are disclosed herein that make anastomosis easier and more time-efficient by enabling the use of anastomotic couplers in microsurgery and laparoscopy. Simplifying the anastomosis procedure minimizes required operator skill, reduces the duration of intense concentration, and helps reduce the surgeon's fatigue during long, complex operative procedures.

The present disclosure and the accompanying drawings are intended to describe some, but not necessarily all, examples or embodiments and does not limit the scope of the disclosure(s) in any way. Any referenced drawings herein may not be to scale and may be exaggerated in scale for convenience of explanation. In the explanation of several different examples of embodiments below, corresponding characteristics are provided with the same reference numbers.

For clarity of disclosure, the terms "proximal" and "distal" are defined herein relative to a human or robotic operator of the surgical instrument. The term "proximal" refers the position of an element closer to the human or robotic operator of the surgical instrument and further away from the surgical end effector of the surgical instrument. The term "distal" refers to the position of an element closer to the surgical end effector of the surgical instrument and further away from the human or robotic operator of the surgical instrument. In addition, the terms "upper," "lower," "lateral," "transverse," "bottom," "top," are relative terms to provide additional clarity to the figure descriptions provided below. The terms "upper," "lower," "lateral," "transverse," "bottom," "top," are thus not intended to unnecessarily limit the invention described herein.

Generally, the present disclosure relates to several systems, methods, and devices for applying anastomotic couplers in order to carry out minimally invasive vascular procedures, and in particular, performing anastomoses between hollow tissue structures when access to the tissue site is limited. In some embodiments, a device (occasionally referred to herein for the sake of brevity as anastomosis apparatus, apparatus, or surgical instrument) is configured for applying anastomotic couplers via a laparoscopic approach and includes a proximal handle portion or interface, an intermediate shaft assembly of body extending distally from the handle portion, and an end effector arranged at a distal end of the shaft assembly.

Figure 1B:
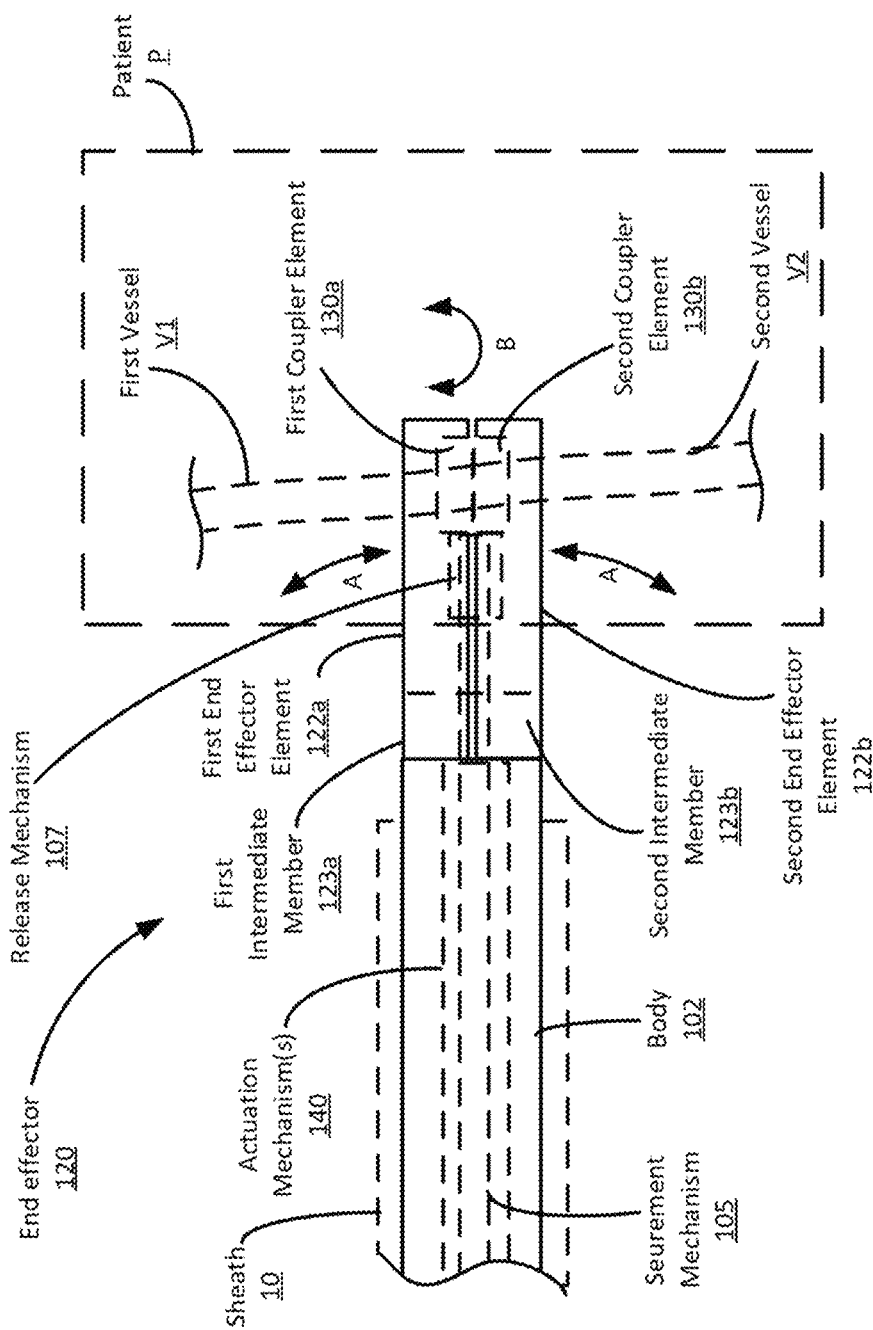
FIG. 1B is schematic illustration of a distal portion of the apparatus of FIG. 1A illustrating a first vessel and a second vessel being coupled to each other via the apparatus of FIG. 1A, according to an embodiment.

For example, FIG. 1A is a schematic illustration of an anastomosis apparatus 100 for performing laparoscopic anastomosis of a first vessel V1 to a second vessel V2, and a FIG. 1B is schematic illustration of a portion of the apparatus 100 of FIG. 1A illustrating the first vessel V1 and the second vessel V2 being coupled to each other via the apparatus 100 of FIG. 1A, according to an embodiment. The apparatus 100 includes a body 102 coupled to an interface 104 that may include one or more actuators 106 included therein or otherwise coupled thereto, an end effector 120 including a first end effector element 122a configured to removably receive a first coupler element 130a of a coupler 130 and a second end effector element 122b configured to removably receive a second coupler element 130b of the coupler 130. The apparatus 100 may optionally also include an actuation mechanism 140, a securement mechanism 105, and/or a release mechanism 107.

The body 102 may include an elongate member that may have a length in a range of 4 inches to 30 inches, inclusive of all sub-ranges and values therebetween (e.g., 4, 6, 7, 8, 9, 10, 11, 12, 15, 18, 21, 25, 28 or 30 inches, inclusive). In some embodiments, the body 102 may have a length of at least 8 inches. The body 102 may be formed from any suitable material, for example, stainless steel, alloys, etc. The body 102 may define a longitudinal channel therethrough through which various components of the apparatus 100 may be disposed. In some embodiments, a sheath 10 may be disposed around the body 102. The sheath 10 may be formed from any suitable material, for example, stainless steel, alloys, plastics, etc. A user may be able to selectively move the body 102 axially within the sheath 102, for example, to extend or withdraw the end effector at least partially into the sheath 10.

A proximal end of the body 102 is coupled to the interface 104 such that the elongate body extends longitudinally therefrom. The interface 104 may include a housing that may have an ergonomic shape for a user to grip. For example, in some embodiments, the interface 104 may be shaped as a handle, or include a finger or hand grip facilitating the user in gripping the interface 104 and manipulating the interface 104 to perform laparoscopic anastomosis of two vessels or any other tubular structures.

One or more actuators 106 may be coupled to the interface 104. In some embodiments, the actuators 106 may include a push buttons, pull levers, triggers structured to be engaged by an index and/or middle finger of the user, thumb triggers configured to be engaged or otherwise manipulated by a thumb of the user, slide actuators, clips, levers, rotating knobs, scissor levers, or another first order level, any other suitable actuator, and/or combination thereof. In some embodiments, the apparatus 100 may also include an actuation mechanism 140 extending through one or more channels defined through the body 102 and operatively coupling the actuator(s) 106 to the end effector 120, for example, to cause a corresponding action or movement of the end effector 120. Such actuation mechanisms 140 may include, for example, rods, gears, rack and pinions, pistons, levers, bands, threads, ropes, pulleys, etc.

For example, the one or more actuators 106 may be configured to cause the first end effector element 122a and the second end effector element 122b to articulate about a distal end of the body 102 in one or more directions to separate from each other and/or to approach one each other. For example, the one or more actuators 106 can be configured to move the first end effector element 122a and the second end effector element 122b between a first configuration where the two end effector elements 122a, 122b are separated from one another and a second configuration where the two end effector elements 122a, 122b are adjacent to one another. In the second configuration, the two end effector elements 122a, 122b can be configured to couple the first coupler element 130a to the second coupler element 130b. In some embodiments, the first and second end effector elements 122a, 122b can also be configured to be in an intermediate configuration, e.g., between the first and second configurations. The one or more actuators 106 can be coupled to the actuation mechanism(s) 107, which can be driven by the one or more actuators 106 to cause movement of the first and second end effector elements 122a, 122b. In some embodiments, the actuator(s) 106 may be configured to cause one or more portions of the end effector 120 (e.g., the first end effector element 122a and/or the second end effector element 122b) to articulate in a single direction (e.g., a first direction), while in other embodiments, the actuator(s) 106 may be configured to cause one or more portions of the end effector 120 to articulate in multiple directions (e.g., a first direction and a second direction). For example, the first direction may involve rotation of a distal end of the first and second end effector elements 122a/b to move about the distal end of the body 102 towards or away from each other as indicated by the arrow A in FIG. 1B. Additionally or alternatively, the second direction may include articulation of the first and second end effectors 122a/b together in a direction that is substantially orthogonal to the first direction as indicated by the arrow B in FIG. 1B, thus allowing flexibility in positioning the end effector 120 at a desired location within a patient's P body. In some embodiments, a first actuator 106 can be configured to rotate the first end effector element 122a about a first axis, e.g., to move the first end effector element 122a toward or away from the second end effector element 122b. In some embodiments, a second actuator 106 can be configured to rotate the second end effector element 122b about a second axis, e.g., to move the second end effector element 122b toward or away from the first end effector element 122a. In some embodiments, the first axis about which the first end effector element 122a is configured to rotate and the second axis about which the second end effector element 122b is configured to rotate can be the same axis, while in other embodiments, the two axes can be offset from one another. In some embodiments, the first and second end effector elements 122a, 122b can also be pivoted about a third axis or angled away from a longitudinal axis of the body, e.g., to position the first and second end effector elements 122a, 122b for easier viewing by a user (e.g., a surgeon).

For example, in some embodiments, movement in the first direction may include articulation of the first and/or second end effector elements 122a/b in a plane extending along a longitudinal axis of the end effector 120, and the second direction may involve articulation of the first and second end effector elements 122a/b about the plane that extends along the longitudinal axis.

As shown in FIGS. 1A-1B, the end effector 120 is coupled to a distal end of the elongate body 102. The end effector 120 includes the first end effector element 122a defining a first receptacle structured to hold the first coupler element 130a of the coupler 130 and the second end effector element 122b defining a second receptacle structured to hold a second coupler element 130b of the coupler 130. The coupler 130 may include any suitable coupler that can be used to couple two vessels or any other tubular tissue structures. For example, the first coupler element 130a may include a ring-shaped member defining a central opening configured to receive an axial end of the first vessel V1. Similarly, the second coupler element 130b may also include a ring-shaped member configured to receive an axial end of a second vessel V2. In some embodiments, the second coupler element 130b may be a mirror image of the first coupler element 130a.

In some embodiments, each of the first and second coupler elements 130a/b may include coupling features, for example, mating snap-fit features (e.g., pins, grooves, slots, ledges, protrusions, notches, indents, detents, etc.) such that when corresponding surfaces of the first and second coupler elements 130a/b are pressed against each other, the first coupler element 130a is coupled to the second coupler element 130b. This also causes corresponding axial ends of the first vessel V1 and the second vessel V2 to be in contact with each other, which can lead to a coupling of the vessels V1 and V2 with each other. In some embodiments, axial ends of the first and the second vessel V1 and V2 may be flared out before coupling them together.

In some embodiments, the first end effector element 122a and the second end effector element 122b can be implemented as jaws or clamp arms that can articulate about their proximal ends such that the proximal ends of first and second end effector element 122a/b remain proximate to each other during operation, while the distal ends of the first and second end effector element 122a/b may be selectively moved away from each other to open or close the end effector 120. For example, the end effector 120 may be configured to move between a first configuration in which at least a portion of the first end effector element 122a (e.g., a distal end thereof) is separate from a corresponding portion of the second end effector element 122b (e.g., a corresponding distal end thereof) such that the first coupler element 130a is separate from the second coupler element 130b, and a second configuration in which at least the portion of first end effector element 122a is proximate to the corresponding portion of the second end effector element 122b such that the first coupler element 130a is coupled to the second coupler element 130b (e.g., as shown in FIG. 1B) so as to couple the first vessel V1 to the second vessel V2.

In some embodiments, the first and the second end effector elements 122a/b may be laterally spaced apart by a fixed or variable distance along their lengths, in the first configuration. The first end effector element 122a and/or the second end effector element 122b may then laterally displace toward each other until the first and second coupler elements 130a/b are coupled together in the second configuration. The lateral displacement can be a lateral translation.

In some embodiments, proximate ends of the first end effector element 122a and the second end effector element 122b may be coupled to a distal end of the elongate body 102. The first coupler element 130a and the second coupler element 130b may be removably coupled to corresponding distal ends of the first end effector element 122a and the second end effector element 122b, respectively. Moreover, the first and the second end effector elements 122a/b may be configured to articulate about the distal end of the elongate body 102 in the first direction (e.g., as indicated by the arrow A to move the end effector 120 between the first and the second configurations. In some embodiments, the proximate ends of the first and the second end effector elements 122a/b may be coupled to the distal end of the elongate body 102 via the actuation mechanism 140 that may be structured to allow articulation of the first and second effector elements 122a/b, as previously described.

In some embodiments, the end effector 120 may also include intermediate members coupling the first and second end effector elements 122a/b to the elongate body 102. For example, as shown in FIGS. 1A-1B, the end effector 120 may include a first intermediate member 123a coupling he first end effector element 122a to the elongate body 102, and a second intermediate member 123b coupling the second end effector element 122b to the elongate body 102. In some embodiments, the first and second intermediate members 123a/b may be configured to articulate about their proximal ends (i.e., about the elongate body 102), and the first and second end effector elements 122a/b to articulate at their respective proximal ends about the distal ends of the first and second intermediate members 123a/b. Thus, the first and second intermediate members 123a/b can enable the first and second end effector elements 122a/b to have multiple degrees of freedom, which may facilitate operations of the end effector 120. In some embodiments, distal ends of the first and second end effector elements 122a/b may be coupled to each other and may be configured to articulate about their respective distal ends. In such embodiments, the end effector 120 may open and close in a cage like fashion for performing vessel anastomoses. Such embodiments are described in further detail with respect to FIGS. 2A-11C.

In some embodiments, the actuation mechanism 140 may also be configured to move the first and the second end effector elements 122a/b into an intermediate configuration in which at least the portion of the first end effector element 122a (e.g., the distal end thereof) is located proximate to the corresponding portion of the second end effector element 122*b* but with a gap therebetween such that the first coupler element 130*a* is not coupled to the second coupler element 130*b*. This may advantageously reduce the lateral width of the end effector 120 to facilitate insertion into the body of the patient P through a small incision (e.g., having a diameter of less than 25 mm), thus reducing injury and allowing faster healing.

Any suitable actuation mechanism 140 may be used. In some embodiments, the actuation mechanism 140 may include a first linkage arm coupled to the first end effector element 122*a* and a second linkage arm coupled to the second end effector element 122*b*. Each of the first and a second linkage arms may include a central hinge such that moving a proximal end of each of the first and second linkage arms proximate to a corresponding distal end of the first and second linkage arm causes the first and second linkage arms to articulate about their respective central hinges away from each other so as to selectively move the end effector from the first configuration to the second configuration. In other words, the first and second linkage arms may serve as scissor arms to cause the first and second end effector elements 122*a/b* to move between the first and the second configurations.

In some embodiments, the actuation mechanism 140 may include at least one pulley coupled to a corresponding one of the first end effector element 122*a* and/or the second end effector element 122*b*. At least one tether may be coupled to the at least one pulley. The at least one tether may be configured to be displaced longitudinally (e.g., by a user via engagement of a corresponding actuator 106). Since the tether runs around the pulley, displacing the tether causes the at least one pulley to rotate and move the end effector between the first and the second configurations.

In some embodiments, the actuation mechanism 140 may include at least one rod coupled to a corresponding one of the first end effector element 122*a* or the second end effector element 122*b* and configured to rotate to cause the end effector 120 to move between the first and second configurations. For example, the at least one rod may be coupled to the corresponding one of the first end effector element 122*a* and/or the second end effector element 122*b* proximate to a radially outer edge of the corresponding one of the first end effector element 122*a* or the second end effector element 122*b*. Thus, rotating the rod causes the radially outer edges of the first and second end effector elements 122*a/b* that are located distal from the axial end of the rod to move proximate to or away from each other, thus moving the end effector 120 between the first and second configurations.

In some embodiments, the end effector 120 may be withdrawn at least partially into an optional sheath 10 or the sheath 10 can be axially displaced relative to the end effector 120 such that an inner surface of a distal end of the sheath 10 covers or surrounds an outer surface of each of the first and the second end effector elements 122*a/b*. In some embodiments, the sheath 10 may have a diameter that is less than or about equal to a maximum lateral width of the end effector 120 such that axial displacement of the sheath 10 toward the end effector 120 (or retraction of the end effector 120 within the sheath 10) urges the first and second end effector elements 122*a/b* into the second configuration.

In some embodiments, at least one closure element may be coupled to the first end effector element 122*a* and the second end effector element 122*b* and configured to urge the end effector towards the second configuration. The closure element may include, for example, mechanical linkages, rope wires, threads, sutures, filaments, extrusions, springs, rubber bands, bungee cords, any other suitable closure element, or any combination thereof. The closure element may be configured to bias the first end effector element 122*a* and the second end effector element 122*b* towards each other so as to facilitate moving the end effector 120 into the second configuration from the first configuration. In some embodiments, a resilient element may additionally, or alternatively, coupled to the first end effector element 122*a* and/or the second end effector element 122*b*, and configured to bias the end effector 120 towards the open configuration. The resilient element may include, for example, a biasing member such as a spring, a resilient plate (e.g., a NITNOL plate), mechanical linkages, rope wires, threads, sutures, filaments, extrusions, etc., and configured to bias the first and/or the second end effector element 122*a/b* towards the first configuration.

In some embodiments, each of first end effector element 122*a* and the second end effector element 122*b* may be configured to torsionally bend along their respective axis to move between the first configuration and the second configuration. For example, each of the first and second end effector elements 122*a/b* may include an actuating backbone that may be in the shape of a continuum structure with helical tendon wire routing. Such structures may include a set of disks through which a push and pull tendon wire is routed following a helical shape around the main axis of the structure. In other embodiments, the backbone may be reticulated. The actuation mechanism 140 may be configured to engage the tendon wire such that the backbone of each of the first and second end effector element 122*a/b* undergoes not only a pure rotation but also a torsion along the backbone main axis causing at least a distal end of the first and second end effector elements 122*a/b* to move away from each other to move the end effector 120 into the first configuration, or to move the first and second end effector elements 122*a/b* towards each other to move the end effector 120 in the second configuration. Such complex motion not only separates the distal tips of the first and second end effector elements 122*a/b* by bending the first and second end effector elements 122*a/b* away from each other, but may also expose the internal face and ultimately the first and second coupler elements 130*a/b* coupled thereto by rotating the first and second end effector about their respective longitudinal axis.

In some embodiments, each of the first end effector element 122*a* and the second end effector element 122*b* may include alignment features defined on corresponding surfaces thereof. The alignment features may be configured to align the first and the second end effector elements 122*a/b* as the end effector 120 moves into the second configuration, for example, to facilitate alignment of the first coupler element 130*a* with the second coupler element 130*b*. Such alignment features may include, but are not limited to, one or more notches, lips, grooves, indents, detents, protrusion, or other mating features that help with coarse and fine alignment of the first coupler element 130*a* with the second coupler element 130*b* during actuation of the apparatus 100 for moving the end effector 120 from the first to the second configuration. Moreover, the end effector 120 may include one or more grips, grooves, surface modifications, latching mechanisms, or any combination thereof to facilitate controlled anastomosis.

Optionally, in some embodiments, the apparatus 100 can include a securement mechanism 105 that may be configured to selectively secure the coupler 130 (e.g., the first coupler element 130*a* and/or the second coupler element 130*b*) to the end effector 122. Optionally, in some embodiments, the apparatus 100 can include a release mechanism 107, for example, to release the first coupler element 130a and/or the second coupler element 130b from the end effector 120. In some embodiments, the receptacles of the first and the second end effector elements 122a/b may include cutouts, cavities, slots, etc., shaped and sized to receive the first and second coupler elements 130a/b, respectively, snugly (e.g., via a friction fit). In some embodiments, the first and second coupler elements 130a/b may be selectively secured in their respective receptacles or released therefrom, e.g., via the securement mechanism 105 and/or the release mechanism 107. For example, the release mechanism 107 may be configured to be selectively actuated to release the coupler 130 from the end effector 120 in the second configuration. In some embodiments, the release mechanism 107 can be coupled to the securement mechanism 105, e.g., such that movement of the securement mechanism 105 can drive movement of the release mechanism 107 to release the coupler 130. Alternatively, the apparatus 100 may not include a securement mechanism 105 or a release mechanism 107. In such instances, a surgeon can use a separate tool (e.g., pliers, hooks, etc.) to disengage the coupler elements 130a/b from the end effector elements 122a/122b.

Any suitable securement mechanism 105 may be used. In some embodiments, at least one of the first coupler element 130a and the second coupler element 130b may define a circumferential groove on a radially outer surface thereof, for example, circumferentially around the first and/or second coupler element 130a/b in a radial edge thereof. In such embodiments, the securement mechanism 105 may include a string (e.g., a twine, a rope, a thread, a band, a chain, etc.) disposed in a portion of the circumferential groove to secure the first coupler element 130a or the second coupler element 130b.

Figure 2:
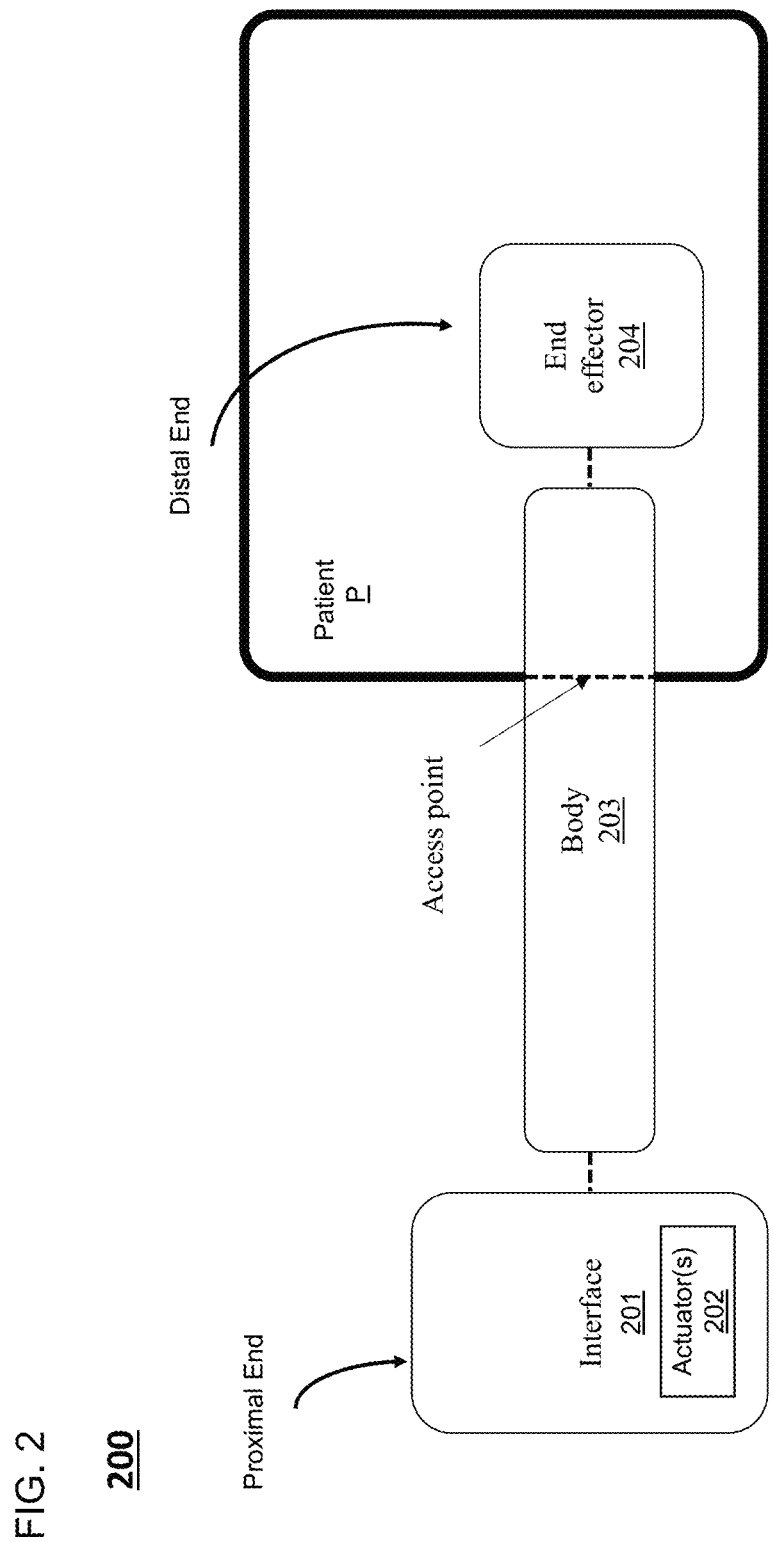
FIG. 2 is a schematic illustration of a laparoscopic device for coupling first vessel to a second vessel using an anastomosis apparatus with respect to the patient body, according to an embodiment.

FIG. 2 shows an illustrative schematic of a laparoscopic anastomosis device, followed by FIGS. 3A-3H showing illustrations of an end effector of the device of FIG. 2 coupling a first vessel to a second vessel, according to various embodiments.

FIG. 2 illustrates a laparoscopic anastomosis device 200, according to embodiments. The proximal end 201 of the device 200 includes actuator(s) 202 interface, e.g., for actuation by a user. The device body 203 acts as a connection point between the proximal and distal ends of the device 200 and embody the form factor of a minimally invasive device. The end effector 204 of the device 200 allows for various operations with appropriate motion ranges based on the connections to the proximal end (including interface 201 and actuator(s) 202), through the body 203.

Figure 3A:
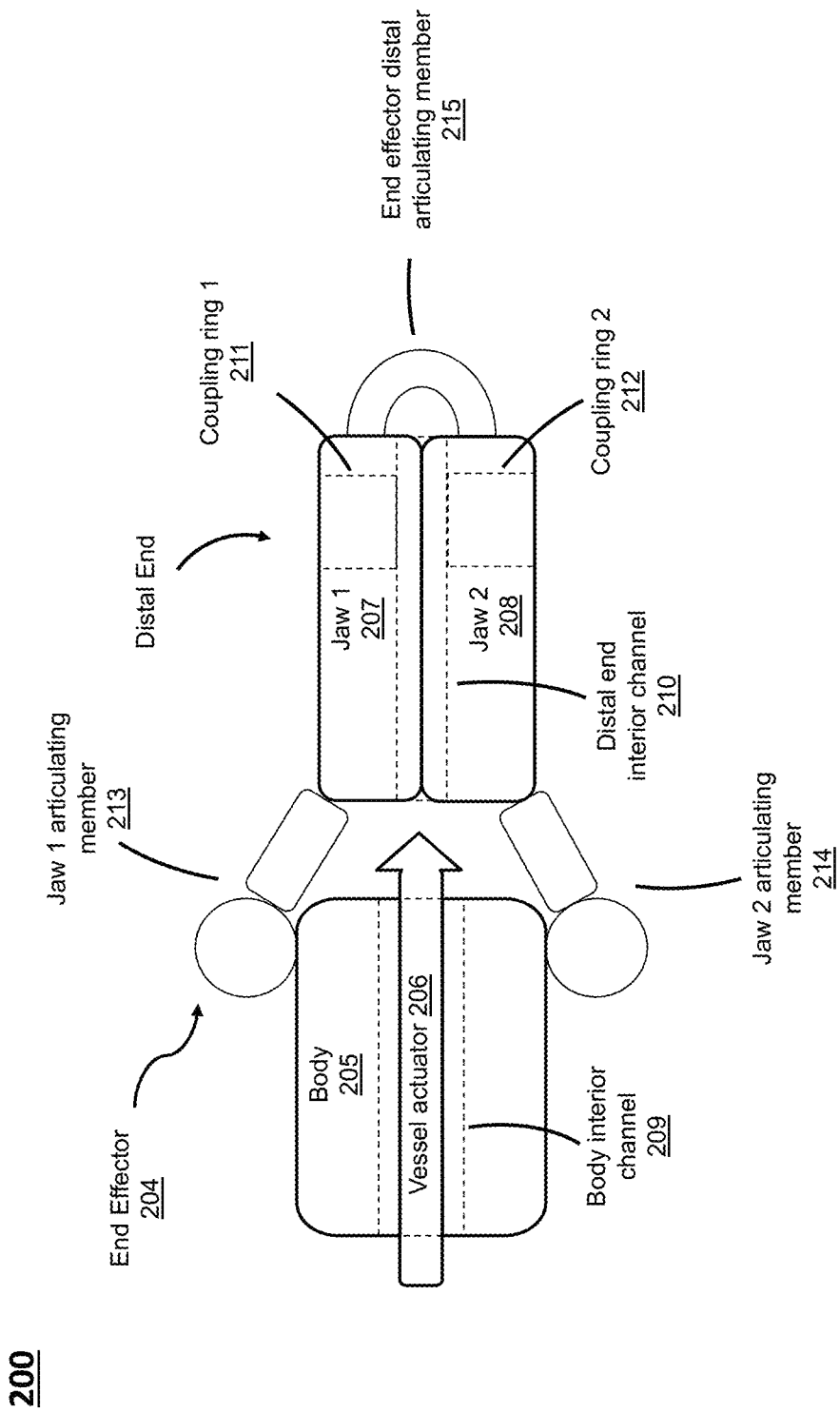

Waking through the steps in use of an embodiment, an illustrative end effector 304 is shown in FIG. 3A. In this embodiment, the distal end of the device, the body 205, and the end effector 304 may include an interior channel 209, 210 used to navigate a vessel actuator 206, that is capable of translating along the axis of the of the interior channels 209 and 210. The vessel actuator 206 may be used to grasp the end of a vessel and connect the vessel to an anastomotic coupling ring 211, 212, that may be present in the corresponding jaws 207, 208. The end effector 204 may include a jaw 207, 208 and an articulating member 213, 214 for the corresponding jaw 207, 208. The distal end of the device may include two jaws 207, 208 that may be connected at the distal tip of the device by an distal articulating member 215. The distal articulating member 215 can allow for a wide range of mobility needed to fulfill three device positions or configurations, e.g., for a successful anastomosis.

Expanding further, the body 205 (also referred to herein as "elongate body 205") includes an elongate structure that extends longitudinally from the interface 201. The elongate body 205 may define an inner channel 209 along a longitudinal axis thereof. A vessel actuator 206 may be configured to be axially displaced or translate through the inner channel 209, for example, to selectively protrude through the end effector 204 by displacing distally relative to the elongate body 205, as described herein. While not shown, in some embodiments, an external sheath may be disposed around the elongate body 205.

The end effector 204 is coupled to a distal end of the elongate body 205 and includes a first end effector element 207 (also referred to herein as "first jaw 207"), a second end effector element 208 (also referred to herein as "second jaw 208"), a first articulating member 213, a second articulating member 214, and in some implementations, a distal articulating member 215 (collectively referred to herein as "device joints 214, 213, 215"). The first end effector element 207 defines a first receptacle, cavity, or opening configured to hold the coupling ring 211 (also referred to herein as "first coupler element 211"), and the second end effector element 208 defines a second receptacle, cavity, or opening, configured to hold the coupling ring 212 (also referred to herein as "second coupler element 212"). The first and second coupler elements 211, 212 form two parts that when coupled together, form a coupler. A distal end of the second end effector element 207 can be coupled to a distal end of the first end effector element 208 such that the first and second end effector elements 207, 208 can articulate about their respective distal ends. For example, in some embodiments, the distal articulating member 215 can couple the distal ends of the first end effector element 207 to the second end effector element 208 to allow the distal ends of the first and second end effector elements 207, 208 to articulate about each other. In some embodiments, the distal articulating member 215 may be configured to enable articulation as well as translation of the first and second end effector elements 207, 208. For example, the distal articulating member 215 may include a longitudinal slot within which a pin is disposed coupling the first end effector element 207 to the second end effector element 208. The pin may allow rotation of the jaw elements of the first and second end effector elements 207, 208 about each other, to move from an open to a closed configuration. Moreover, the pin may be configured may be slide in the longitudinal slot, for example, in the closed configuration of the end effector 204 to allow the first and second end effector elements 207, 208 to slide towards (or away) from each other. This may facilitate alignment of the coupler elements 211, 212 disposed in the respective first and second end effector elements 207, 208 with each other, as well as allowing movement of the first and second end effector elements 207, 208 and thereby, the coupler elements 211, 212 towards each other to facilitate coupling of the coupler elements 211, 212, and anastomosing axial ends of the two vessels V1 and V2, as previously described herein.

The first articulating member 213 couples a proximal end of the first end effector 207 to the elongate body 205, and the second articulating member 214 couples a proximal end of the second end effector element 208 to the elongate body 205. For example, the proximal ends of the first and second articulating members 213, 214 may be coupled to an outer end surface or portion of the elongate body 205 and configured to articulate about their respective distal ends. The distal ends of the first and second articulating members 213, 214 can be coupled to proximal ends of the first and second end effector elements 207, 208, respectively, such that the first and second end effector elements 207, 208 can articulate about the corresponding distal ends of the first and second articulating members 213, 214, respectively. In this manner, the combination of the first and second articulating members 213, 214, that can articulate about their proximal ends, the first and second end effector elements 207, 208, that can articulate about their respective proximal ends at the corresponding distal ends of the first and second articulating members 213, 214, and the distal articulating member 215, forms a cage like structure having multiple degrees of freedom. This can allow the cage like structure to be opened, closed, and/or moved into different angular positions to facilitate insertion of axials ends of vessels V1 and V2 into the first and second coupler element 211, 212 and coupling of the first and second coupler elements 211, 212 for anastomosing distal ends of the vessels V1, V2.

In some embodiments, first and second articulating members 213, 214 may be coupled to the elongate body 205 via coupling elements or linkages that are configured to allow sliding or translation of the first and second articulating members 213, 214 that couple end effector 204 to the elongate body 205 along a side of the elongate body 205. This may allow the first and second articulating members 213, 214 and thus, the first and second end effector elements 207, 208 to translate proximally or distally, thus facilitating translation as well as rotation of the end effector 204 in various directions. In various embodiments, the coupling elements or linkages may include slots defined in the sidewall of the elongate body 205, and sliding linkages coupled to the slots or to couplers within the slots allowing for an increased range of motion.

The end effector 204 can be configured to move between various positional configurations. For example, in some embodiments, the end effector 204 is configured to move between: (i) a first configuration in which the first and second articulating members 213, 214 dispose the first end effector element 207 separate from the second end effector element 208 in a first position to allow a first axial end of a first vessel V1 to be received into the first coupler element 211; (ii) a second configuration in which the first and second articulating members 213, 214 dispose the first end effector element 207 separate from the second end effector element 208 in a second position different from the first position to allow a second axial end of a second vessel V2 to be received into the second coupler element 212; and (iii) a third configuration in which the first and second articulating members 213 dispose at least a portion of the first end effector element 207 proximate to a corresponding portion of the second end effector element 208 such that the first coupler element 211 is coupled to the second coupler element 212 to couple the first vessel V1 to the second vessel V2. In some embodiments, the end effector 204 is also configured to move into an intermediate configuration in which at least the portion of first end effector element 211 is proximate to the corresponding portion of the second end effector element 212 but with a gap therebetween such that the first coupler element 211 is not coupled to the second coupler element 212. The intermediate configuration may facilitate insertion of the end effector 204 into a target surgical site, for example, within the body of a patient.

In some embodiments, in the first configuration, at least a portion of the first end effector element 207 is nearly perpendicular, to the axis of the elongate body 205, and in the second configuration, at least a portion of the second end effector element 208 is nearly perpendicular to the axis of the elongate body 205. As described herein, the term "nearly perpendicular" means +/−10 degrees of perpendicular, or at an angle in a range from 80 degrees to 90 degrees of the axis of the elongate body 205. For example, the first step in the device workflow, as shown in FIG. 3B, may include positioning the first jaw 207 perpendicular to the axis of the vessel actuator 206. The device joints 214, 213, 215 are articulated appropriately to enable this configuration. For example, the distal end of the first articulating member 213 is articulated towards the axis of the elongated body 205 about its proximal end, and the distal end of the second articulating member 214 is articulated away from the axis of the elongated body 205 about its proximal end to cause at least a portion of the first end effector element 207 to be oriented nearly perpendicular to the axis of the elongate body 205. This then allows for advancement of the vessel actuator 206 through the first coupling ring 211. For example, the first coupler element 211 may be disposed in the receptacle such that in the first configuration, an aperture of the first coupler element 211 is nearly axially aligned with the elongate body 205. Once the vessel actuator 206 has passed the coupling ring 211, the vessel actuator 206 can be advanced into the lumen, through the end of the first vessel V1.

The various positions of the end effector 204 may be accomplished through controlled actuation of articulating joints using, for example, tethers, rope wires, mechanical linkages, electrical motors, electroactive polymers, magnets, push rods, translating pins, rivets, swivel joint, rotating pins, shafts, bearings, sleeve bearings, and/or a combination of the above. For example, in some embodiments, the device 200 may include a first tether having a first distal end coupled to the first articulating member 213, and a second tether having a second distal end coupled to the second articulating member 214. The first tether and the second tether can be moved independently to control movement of the first and second articulating members between first, second, and/or third configuration. In other embodiments, the device 200 may include a tether having a first distal end coupled to the first articulating member 213 and a second distal end coupled to the second articulating member 214.

As a second step, as shown in FIG. 3C, the vessel actuator 206 is actuated to engage the internal lumen of the first vessel. This allows for the robust connection between the first vessel V1 and the vessel actuator 206 to allow for passage of the first vessel V1 through the coupling ring 211. The vessel actuator 206 may be configured to cause the axial end of the first vessel V1 to be received into the first coupler element 211 in the first configuration. For example, the vessel actuator 206 may configured to translate through the first coupler element 211 in the first configuration. The vessel actuator 206 may also be configured to grab, secure, clamp or otherwise capture the axial end of the first vessel V1 and draw it back through the aperture of the first coupler element 211. The vessel actuator 206 can engage the internal lumen of the first vessel V1 using a mechanical mechanism, such as, but not limited to, an expanding basket, expanding wires, a flaring mechanism, negative pressure, vacuum, suction, barbs, hooks, tacks, etc. The vessel actuator 206 is then retreated, through the coupling ring 212, and into the body interior channel 209, thereby advancing the blood vessel V1 along with the vessel actuator 206. Once the end of the first blood vessel V1 has been successfully passed through the coupling ring, the vessel actuator 206 may be further actuated to facilitate connection of the blood vessel V1 to the coupling ring 212. The connection of the vessel end of the first vessel V1 to the coupling ring 211 may be accomplished through eversion or flaring of the blood vessel ends. This eversion of the blood vessel end may be facilitated by the vessel actuator 206 through a mechanical, hydraulic, or pneumatic expansion of the vessel actuator and blood vessel connection. Once the blood vessel V1 is connected to the coupling ring 212, the connection between the blood vessel V1 and the vessel actuator 206 may be severed, the vessel actuator 206 may then be relaxed and retreated (e.g., completely or partially) within the body interior channel 209. For example, the first coupler element 211 can include securement members such as pins, hooks, indents, detents, or any other securement members on an inner surface thereof. The eversion of the axial end of the first vessel V1 can cause the securement members to secure the axial end of the first vessel V1, for example, by piercing through the wall of the first vessel V1 such that when the vessel actuator 206 is withdrawn from the first vessel V1, the axial end of the first vessel V1 remains secured to the first coupler element 207.

The above-described configuration and positions may be controlled from the proximal end of the device through appropriate linkage mechanisms that pass through the body 205.

Figure 3D:
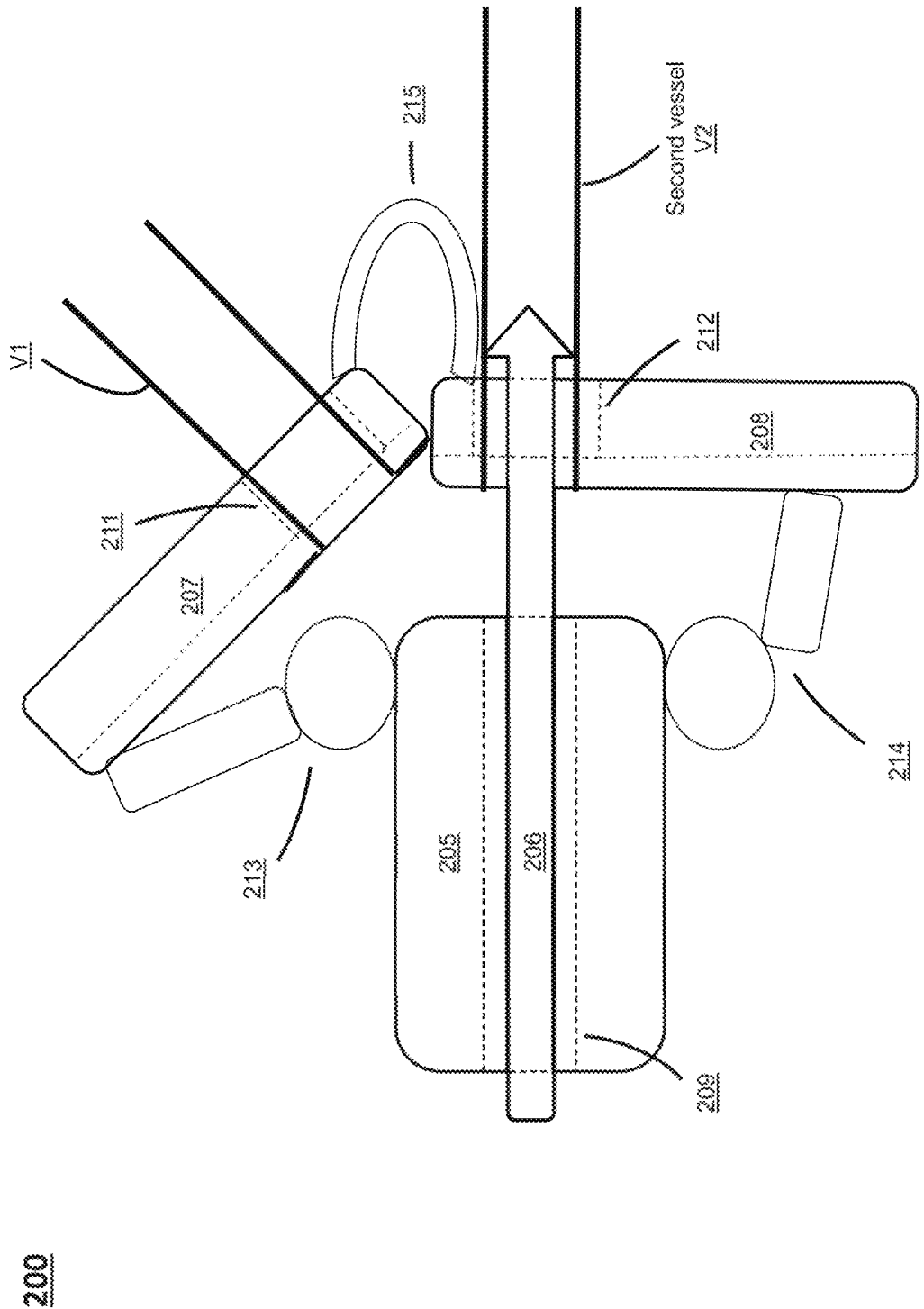
Figure 3F:
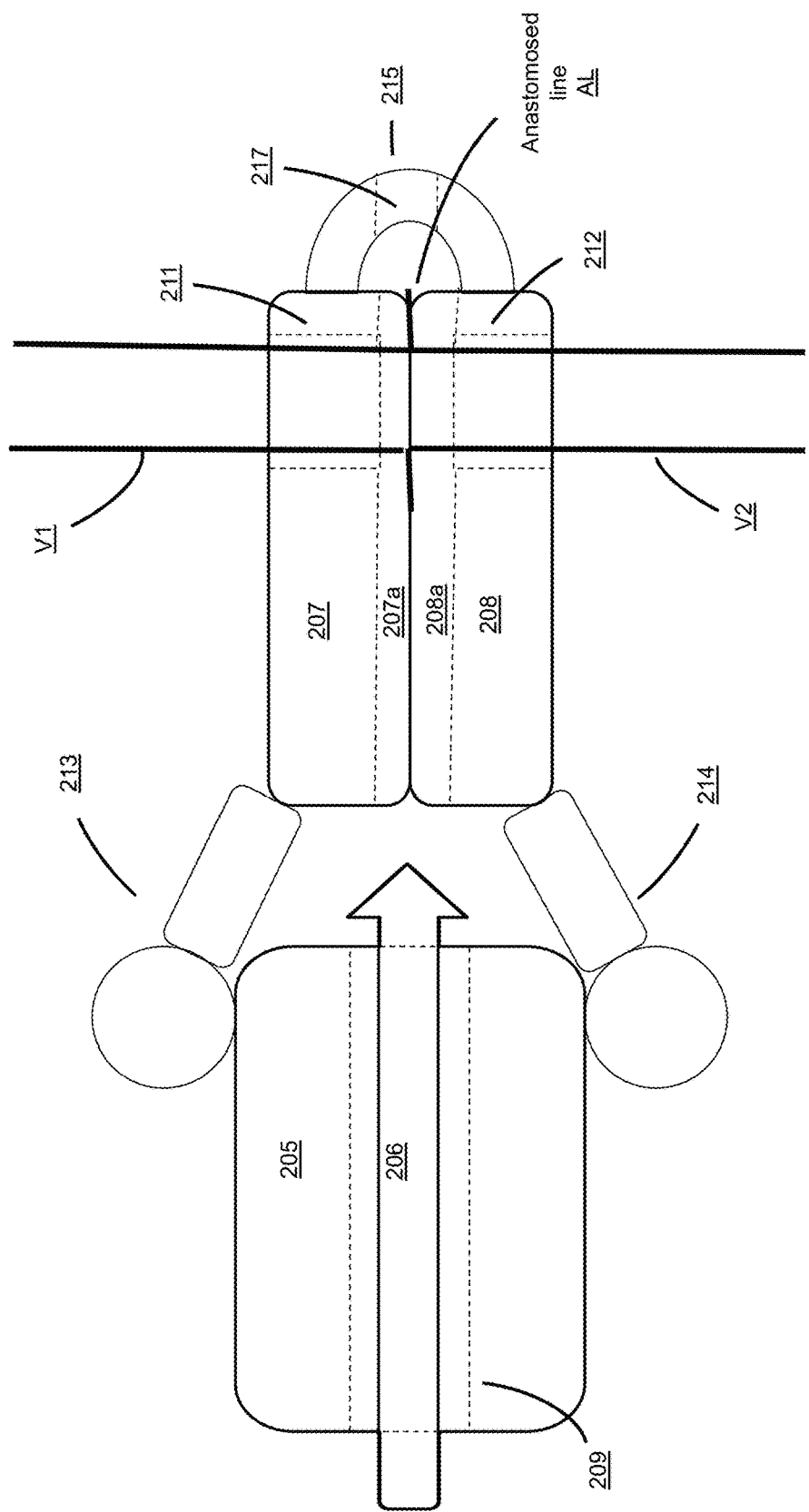

The procedure may be repeated, as shown in FIGS. 3D and 3E, for the second vessel V2. For example, the distal end of the first articulating member 213 is articulated away from the axis of the elongated body 205 about its proximal end, and the distal end of the second articulating member 214 is articulated toward the axis of the elongated body 205 about its proximal end to cause at least a portion of the second end effector element 208 to be oriented nearly perpendicular to the axis of the elongate body 205, and an aperture of the second coupler element 212 is nearly axially aligned with the axis of the elongate body 205. The vessel actuator 206 may be configured to cause the axial end of the second vessel V2 to be received into the second coupler element 212 in the second configuration, and the axial end of the second vessel V2 to be coupled to the second coupler element 212, as described with respect to the first configuration. Once the second vessel attachment is completed, both vessels are attached to their respective anastomotic coupling rings. The end effector 204 may be articulated to bring both jaws 207, 208 together by moving the end effector 204 in the third configuration. For example, one or more additional actuators such as tethers, ropes, wires, or other actuators may be coupled to the first and/or second articulating members 213, 214, or the first and or second end effector elements 207, 208 and configured to cause of the distal ends of first and second articulating members 213, 214 to move towards each other. This causes the distal ends first and second end effector elements 207, 208 to articulate about the distal articulating member 215 such that the proximal ends of the first and second end effector elements 207, 208 displace close to each other until the end effector 204 closes. This action joins the coupler elements 211, 213 together, as illustrated in FIG. 3F.

Figure 3G:
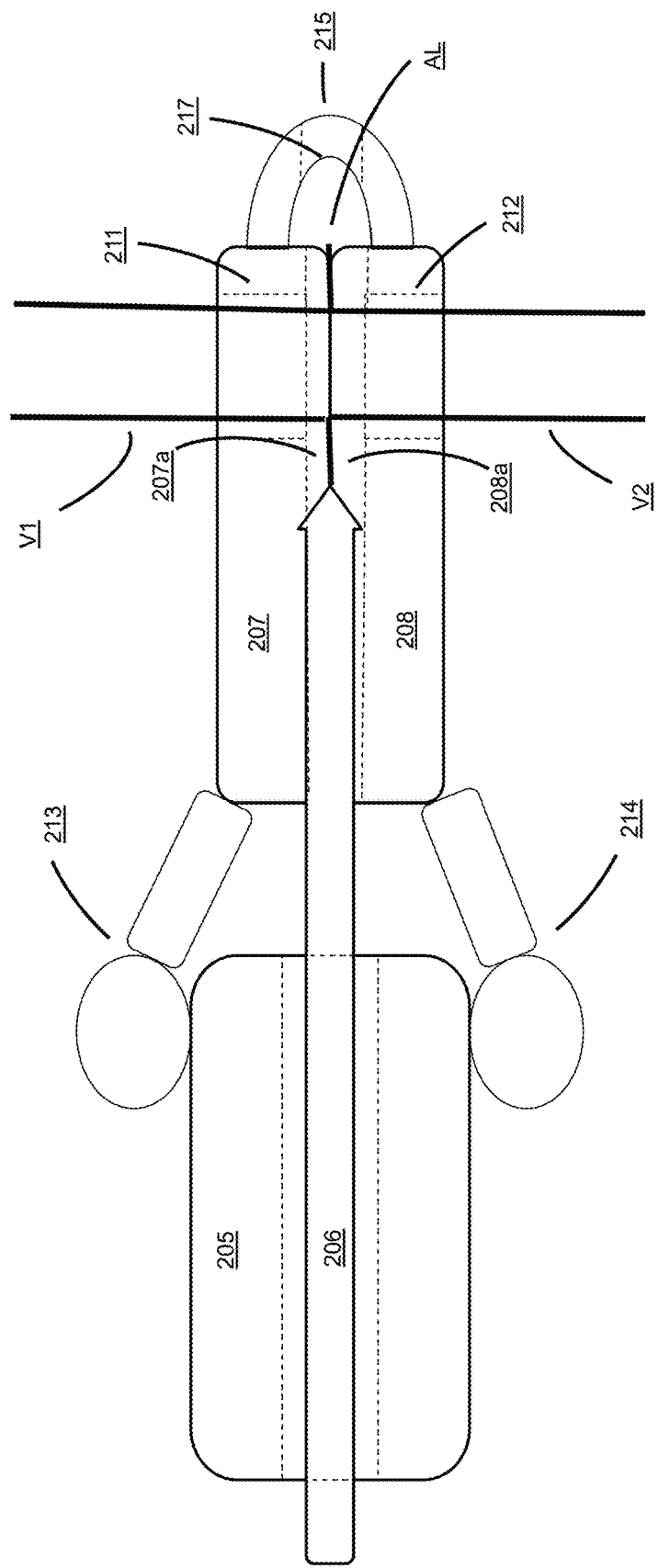

The vessel actuator 206 may then be advanced through the distal channel 210, separating the anastomosed vessel line AL, as shown in FIG. 3G and FIG. 3H. As previously described herein, the first end effector elements 207 defines a first channel 207a, and the second end effector element 208 defines a second channel 208a that is continuous with the apertures defined in the first and second end effector elements 207, 208 that hold the first and second coupler elements 211, 212, such that in the third configuration, the vessel actuator 206 can be moved axially into the channels 207a/b until a tip of the vessel actuator 206 contacts the coupler elements 211, 212. The distal articulation member 215 defines an opening 217 that is continuous with the channels 207a/b in the third configuration. Continued displacement of the vessel actuator 206 through the channels 207a, 208a pushes the first and second coupler elements 211, 212 that are coupled to each other, out of their respective apertures into and through the opening 217 until the coupler elements 211, 212 are removed from the end effector 204.

Figure 4A:
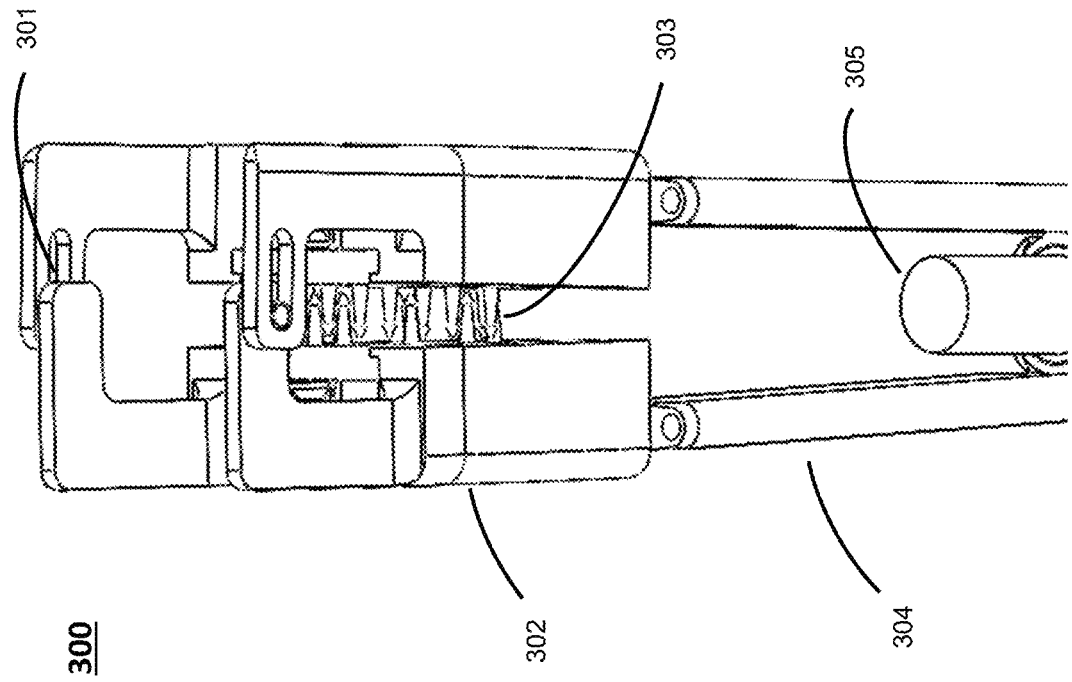

An exemplary embodiment of a laparoscopic anastomosis device 300 and the steps to create anastomosis are shown in FIGS. 4A-4F. The laparoscopic device shown in FIGS. 4A-4F can be structurally and/or functionally similar to other devices described herein, including, for example, that described with reference to FIGS. 3A-3H. FIG. 4A shows a perspective view of the end effector in a collapsed state that allows for passage of the device through a small opening. Each of the end effectors can include a jaw 302, coupler element 303, and an articulating member 304. Additionally, the two end effectors maybe coupled at the distal tip 301 using one or more of the following means of coupling, but not limited to, swivel pins, rope wires, mechanical linkage, sliding linkage, living hinge, hinge mechanism, magnetic coupling, electromagnetic coupling. In some embodiments, the distal tip 301 may be configured to enable articulation as translation of the elements of the jaw 302. For example, the distal tip may include a longitudinal slot within which a pin is disposed coupling a first jaw element to a second jaw element of the jaw 302. The pin may allow rotation of the jaw elements of the jaw 302 about each other, to move from an open to a closed configuration. Moreover, the pin may be configured may be slide in the longitudinal slot, for example, in the closed configuration of the jaw 302 to allow the elements of the jaw 302 to slide towards (or away) from each other. This may facilitate alignment of the coupler elements 303 disposed in the respective jaw elements with each other, as well as allowing movement of the jaw elements 302 and thereby, the coupler elements 303 towards each other to couple the coupler elements, and anastomosing axial ends of the two vessels, as previously described herein.

Figure 4B:
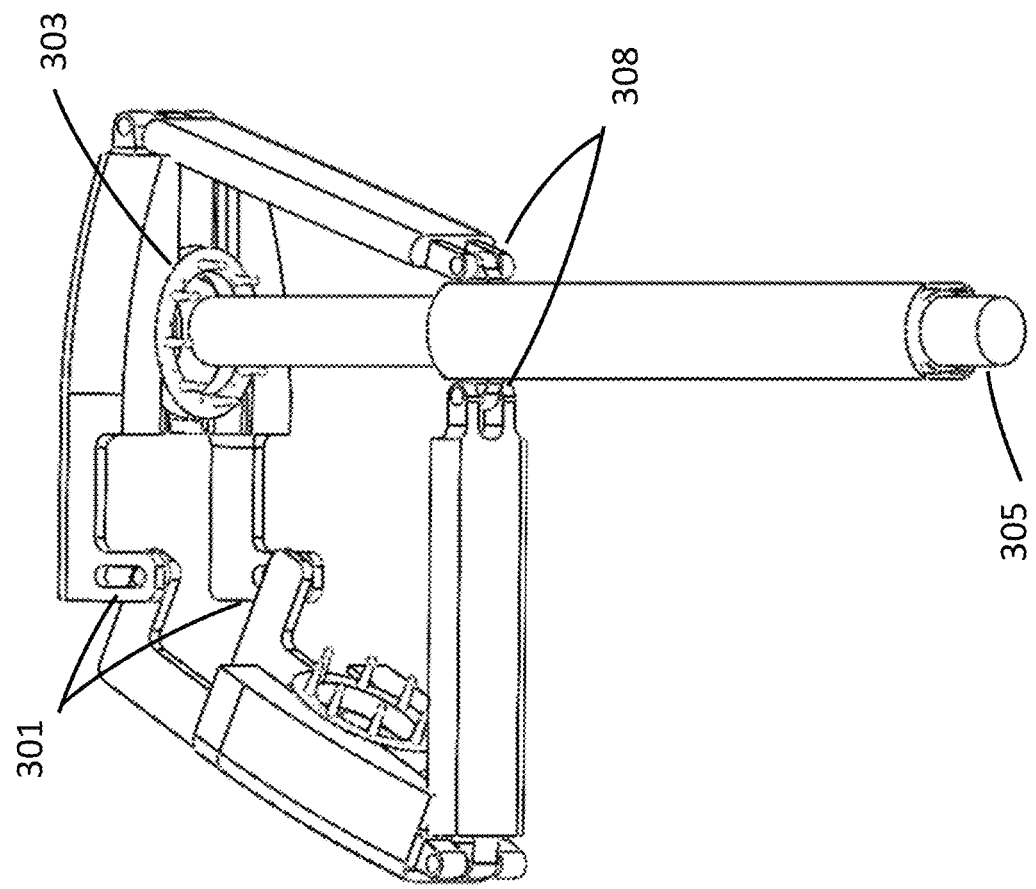
Figure 4C:
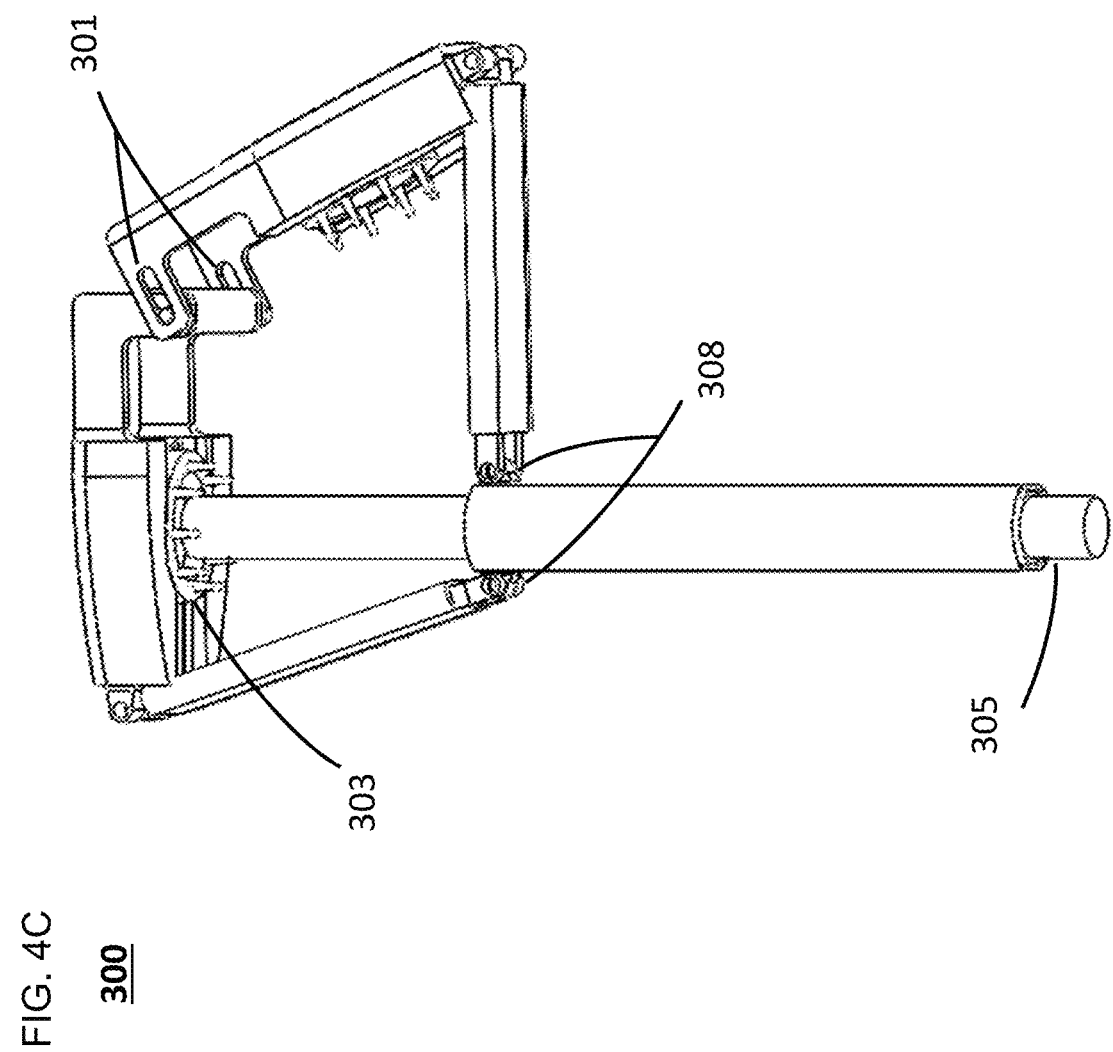

FIGS. 4B and 4C provide a perspective view of an exemplary position that allows for advancement of the vessel actuator 305 through the coupling ring (coupler element) 303, engagement of the vessel axial end to the vessel actuator, or transfer of connection from the vessel actuator and vessel to the vessel and coupler element. The articulating members 304 including the end effector may be connected to the distal end of the elongate body using a mechanical linkage 308. A detailed view of such a mechanical linkage 308 is shown in FIG. 4C. For example, in some embodiments, mechanical linkages 308 may be configured to allow sliding or translation of the articulation members that couple end effector 304 to the device body 305 along a side of the device body 305. This may allow the articulation members of the end effector 304 to translate proximally or distally independently thus facilitating translation as well as rotation of the end effector 304 in various directions. In various embodiments, the mechanical linkages 308 may include slots defined in the sidewall of the device body 305, and sliding linkages coupled to the slots or to couplers within the slots allowing for an increased range of motion.

Figure 4D:
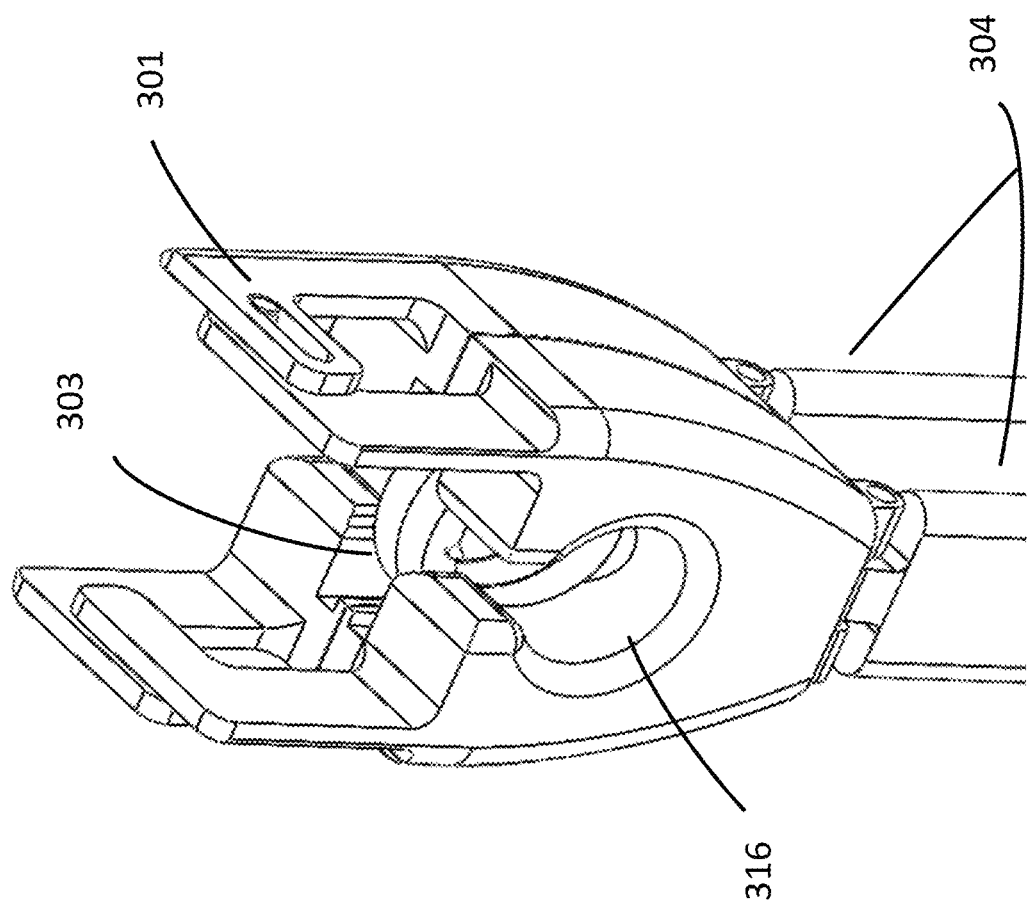

FIG. 4D is a perspective view of another exemplary position of the laparoscopic anastomosis device that allows for coupling of the first coupling element to the second coupling element, by bringing the first and second end effector elements proximate to each other, thereby allowing for coupling of the two vessels. The end effector elements allow for passage of the vessel ends through an opening 316 in the end effector elements and allows for connection to the coupling element 303.

Figure 4F:
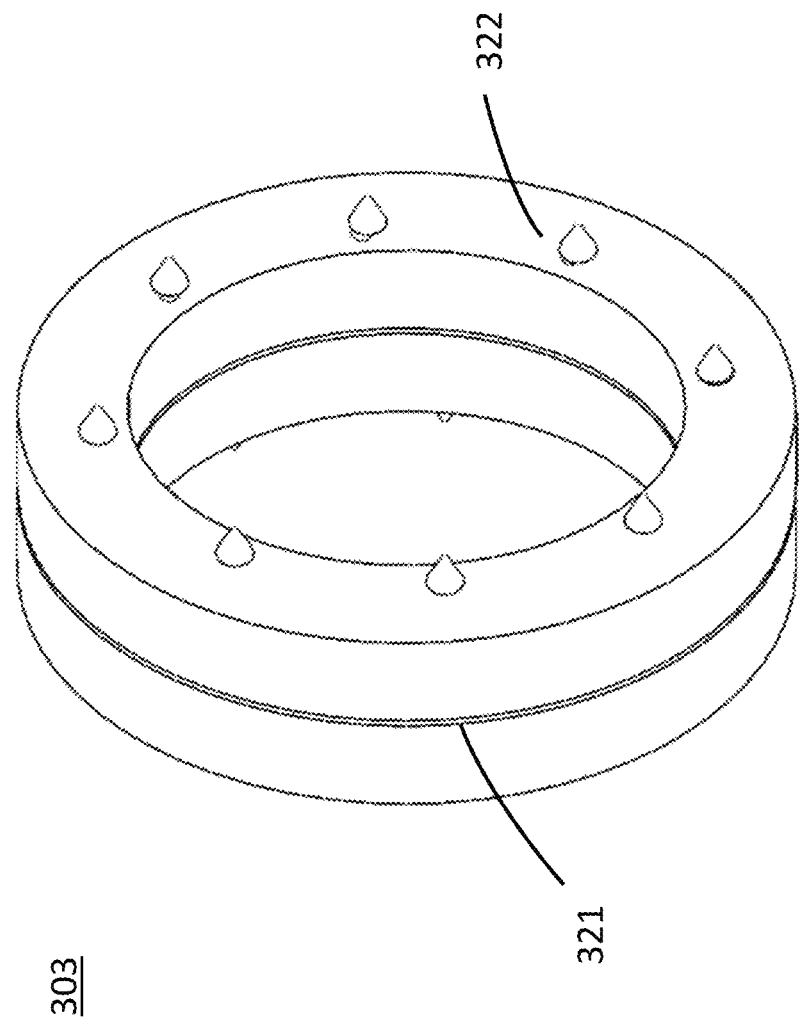

FIG. 4E shows an exemplary illustration of the vessel actuator 305, which can be used to disconnect the coupling elements 303 from the rest of the laparoscopic anastomosis device. FIG. 4F shows an exemplary embodiment of the coupling elements 321, 322 in a mated configuration.

The coupling elements 321, 322 may include an annular body with multiple pins, with the two coupling elements having a plurality of holes such that the pins align with the holes as the two coupling elements are approximated close to each other. The annular body and pins may include, for example, plastic, metal, 3D printed polymer, biodegradable material, or a combination thereof.

Figure 5A:
FIGS. 5A and 5B flow chart of a method for laparoscopically coupling a first vessel to a second vessel, according to an embodiment.
Figure 5B:
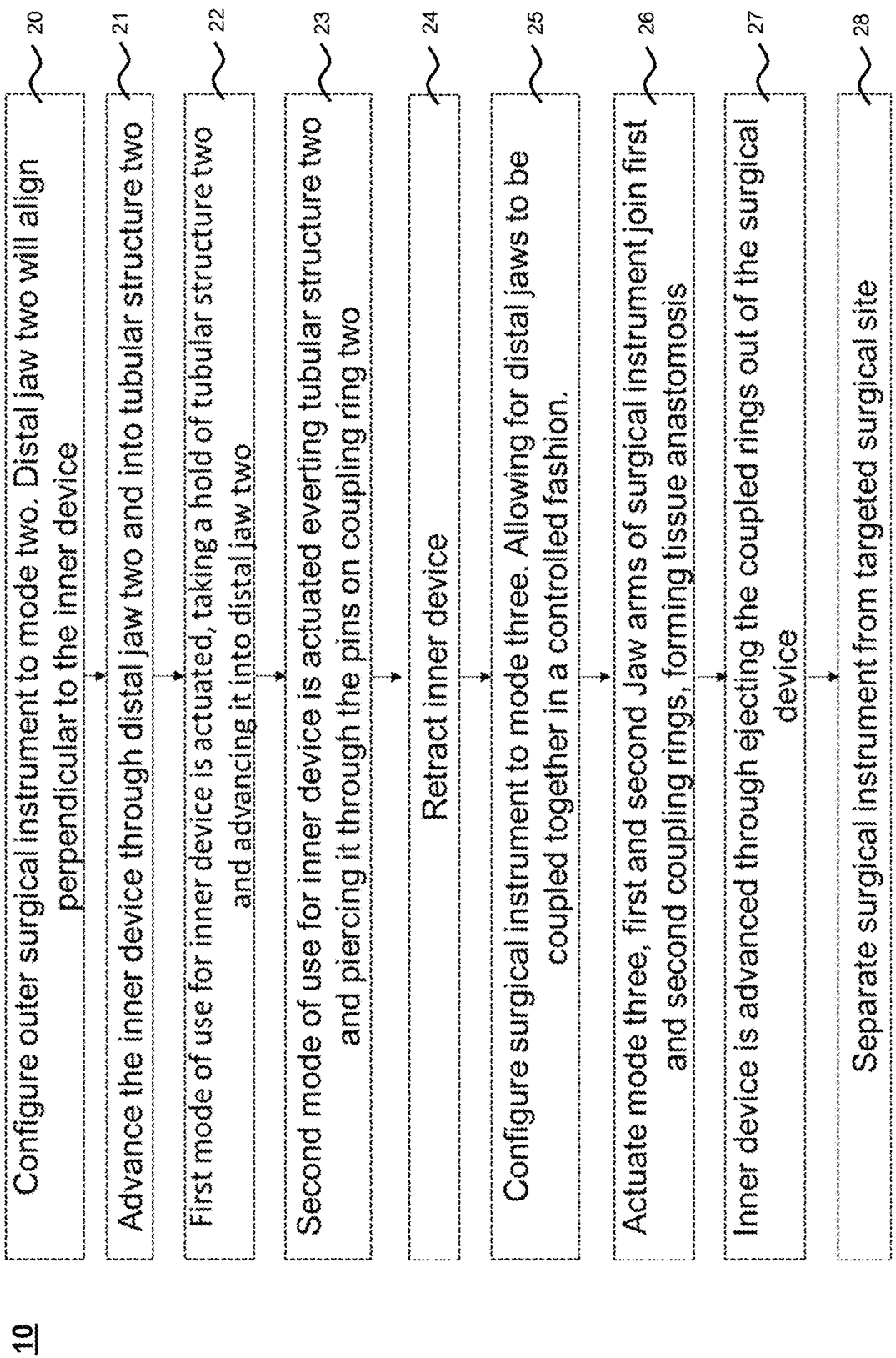

FIGS. 5A-5B show the flowchart of the method 10 to use an illustrative device or surgical instrument to complete anastomosis of one vessel to another, according to embodiments. The method may include dissecting tissue to isolate a first tubular tissue structure. A first tubular tissue structure is ligated. The tissue is dissected to isolate a second tubular tissue structure. The second tubular tissue structure is ligated. The process 10 may also include closing at least a portion of the first and second tubular tissue structure to prevent blood loss.

The first and second clamp arms can move to an open configuration. The method 10 may also include passing at least a portion of first tubular tissue structure through a first coupler ring of a first clamp arm of the surgical instrument, and passing at least a portion of a second tubular tissue structure through a second coupler ring of a second clamp arm of the surgical instrument. The method 10 may also include securing at least a portion of the first and second tubular tissue structure to at least a portion of the first and second clamp arms, causing a change in the configuration of the first and second clamp arms to securely join the first and second tubular tissue structures. A configuration change of the end effector of the surgical instrument may be caused to separate the first and second tubular tissue structures from the distal aspect of said surgical instrument. A change in the configuration of the first and second clamp arms may be caused to move the clamp arms into a closed configuration, and the surgical instrument may be separated from the target surgical site. The first and second tubular tissue structure may be opened to enable fluid flow therebetween.

Complete closure of the clamp arms of any of the end effectors described herein may be desirable, for example, because incomplete closure may lead to potential leakages, clotting, and hemorrhaging. The clamp arms may be configured to mate with each other and to overcome the forces of friction involved with mating of the coupler rings, for example, where the pins of the rings need to slide into corresponding holes. The closure forces may be increased by addition of elements to the end effectors. Such elements may include, for example, a sheath (e.g., the sheath 10, FIG. 1B) that may be used for external compression of the clamp arms together. In some embodiments, mechanical linkages or pull wires internal to the clamp arms may be used to pull the two clamp arms closer to one another. In some embodiments, suitable elements for closing the two clamp arms may include magnets, electromagnets, compression using pneumatic, and/or hydraulic elements. Additionally, or alternatively, the clamp arms may include ultrasound transducers that help overcome the frictional forces as the pins of the coupler rings slide into the corresponding snap-fit channels or holes.

Expanding further, the method 10 may include preparing a first tubular tissue structure for anastomosis, at 11, for example, by isolating and ligating the first tubular tissue structure (e.g., a first vessel). At 12, a second tubular tissue structure is prepared for anastomosis, for example, by isolating and ligating the second tubular tissue structure (e.g., a second vessel). At 13, a surgical instrument (e.g., the apparatus 200) is prepared, for example, by loading coupling rings 211, 212 into end effectors 207, 208. At 14, the surgical instrument is introduced to target surgical site, for example, by making an incision in the patient's body and moving the apparatus 200 into the intermediate configuration.

At 15, the outer surgical instrument is configured for mode one, for example, by moving the end effector 204 into the first configuration, to align distal jaw one (i.e., first end effector element 207) perpendicular to vessel actuator 206 or inner device. At 16, the vessel actuator 206 is advanced through the first end effector element 207 and into the first tubular structure. At 17, first mode of use of the vessel actuator 206 is actuated in which the vessel actuator 206 advances through the first coupler element 211, secures an end of the first tubular structure, and advances the end into the first coupler element 211. At 18, second mode of the use of the vessel actuator 206 is activated in which the vessel actuator 206 everts the end of first tubular structure and pierces the end through corresponding pins of the first coupler element. At 19, the vessel actuator 206 is retracted into the elongated body 205.

At 20, the outer surgical instrument is configured for mode one again, for example, by moving the end effector 204 into the second configuration, to align distal jaw two (i.e., second end effector element 208) perpendicular to vessel actuator 206. At 21, the vessel actuator 206 is advanced through the second end effector element 208 and into the second tubular structure. At 22, first mode of use of the vessel actuator 206 is actuated in which the vessel actuator 206 advances through the second coupler element 212, secures an end of the second tubular structure, and advances the end into the second coupler element 211. At 23, second mode of the use of the vessel actuator 206 is activated in which the vessel actuator 206 everts the end of second tubular structure and pierces the end through corresponding pins of the second coupler element. At 24, the vessel actuator 206 is retracted into the elongated body 205.

Figure 6:
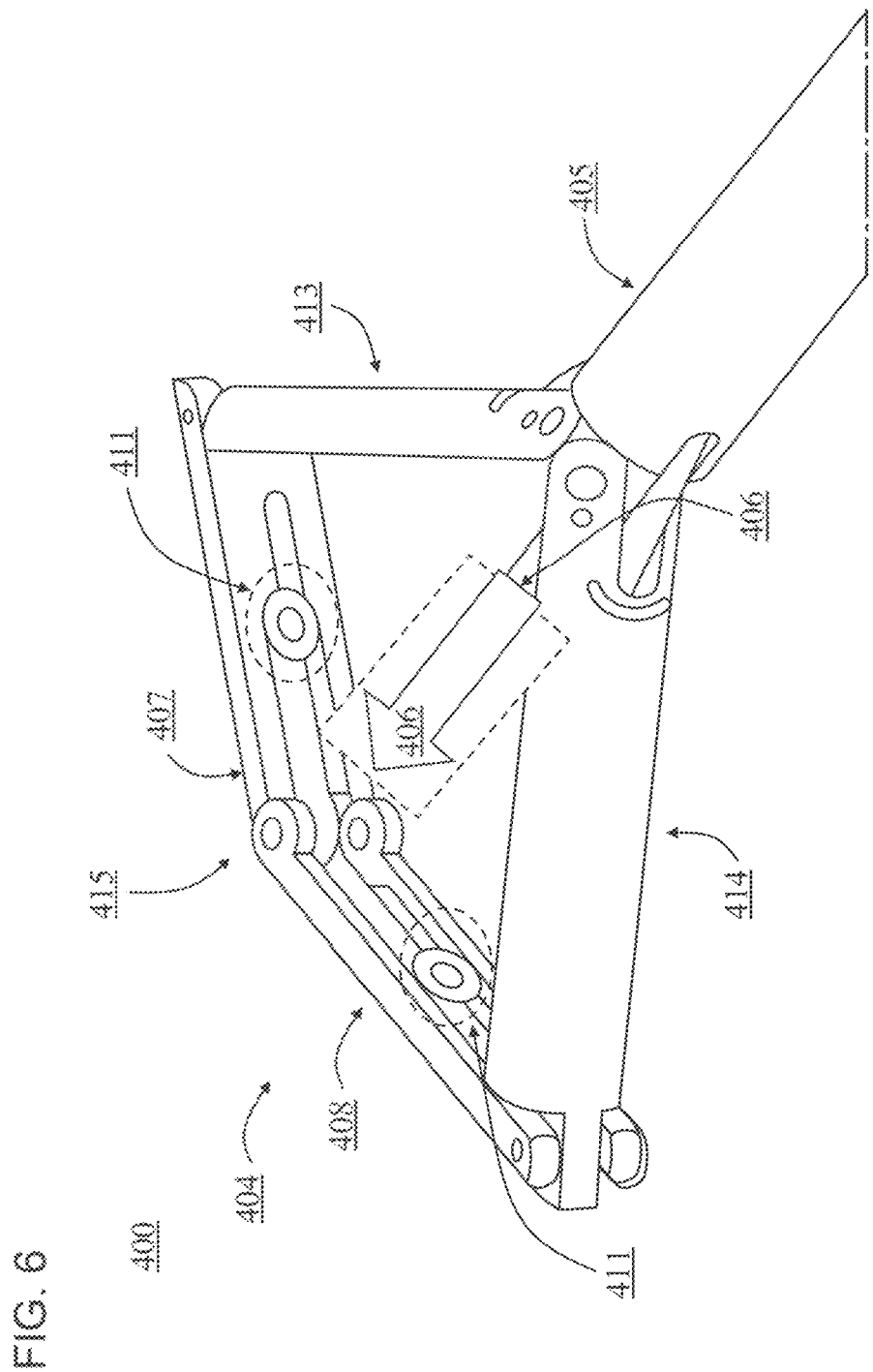
FIG. 6 is a perspective view of a portion of an apparatus for performing laparoscopic anastomosis of two vessels, according to an embodiment.

At 25, the surgical apparatus is configured for mode three, for example, preparing the end effector 204 for moving into the third configuration. At 26, mode three is actuated by closing the first and second end effector elements 207, 208, thereby joining first and second coupler elements 211, 212 by moving the end effector 204 into the third configuration. At 27, vessel actuator is advanced through the end effector 204 to eject the coupler elements 211, 212 out of the end effector 204. At 28, the surgical instrument is retracted and removed from the targeted surgical site FIG. 6 shows a perspective view of an apparatus 400, according to an embodiment. The apparatus 400 is substantially similar to the apparatus 200 and 300 previously described herein, and includes an elongate body 405, a vessel actuator 406 disposed through the elongate body 405, and an end effector 404 that includes a first end effector element 407, a second end effector element 408, a first articulation member 413, a second articulation member 414, and a distal articulation member 415, which are substantially similar in structure and function to the elongate body 205, the vessel actuator 206, the first end effector element 207, the second end effector element 208, the first articulation member 213, the second articulation member 214, and the distal articulation member 215, previously described herein. The first and second effector elements 407, 408 define receptacles 419a, 419b within which first and second coupler elements (e.g., the first and second coupler elements 211, 212) may be disposed, respectively, as previously described herein. The end effectors 407, 408 also define an opening 417 for allowing coupler elements to be removed from the end effector 404 via the vessel actuator 406, as previously described herein.

Further breakdown of the apparatus 400 can be found in FIG. 7. Referring to FIGS. 7-11, the apparatus 400 includes first actuators 422a/b, second actuators 424a/b, and third actuators 426a/b configured to cycle the end effector 404 through different modes of actuation by changing the distance relative between the components 407, 408, 413, 414, and 415. As shown in FIGS. 7-11, the actuators 422a/b, 424a/b, and 426a/b include tethers, but in other embodiments, can include any suitable actuators, for example, ropes, wires, pulleys, pins, rods, etc. In the implementations shown, this change is distance is achieved by exerting pull force on in different configurations on three sets of actuators 422a/b, 424a/b, and 426a/b, illustrated as wires herein, with six wires total, three on the right (R) and three on the left (L) side. The final desired position output, right cage configuration of the end effector 404, middle cage configuration of the end effector 404, left cage configuration and collapse cage configuration can determine the pull combination, i.e., the pull exerted on one or more of the actuators 422a/b, 424a/b, 426a/b. The pull force can be broken down into three categories, OFF, MED, and ON. Where OFF means that zero force is exerted on the desire wire, MED, the wire is kept taut, and ON means that the wire has been pulled to the full range of motion that it can be displace to. FIG. 11 breaks down the different combinations of pull force needed from each set of wires to output a desired distal mode.

The first actuators 422a/b (also referred to herein as "distal wires 422a/b") may include wires that are coupled to the first end effector element 407 and the second end effector element 408b. respectively by inserted into slots 421a/b defined on an outer surface of the first and second effector elements 407, 408 respectively. Pulling on the first actuators 422a/bb cause the first and second end effector elements 407, 408 to articulate about the distal articulation member 415, and thus, causing the first and second end effector elements 407, 408 to articulate about their respective proximal ends to move the end effector 404 into an open configuration, as shown in FIGS. 7B. Different from the end effector 205, 305, distal ends of the first and second end effector elements 407, 408, and/or the distal articulation member 415 are shaped to form a distal end stop 416 that limits angular motion of the first and second end effector elements 407, 408, and thereby, the end effector 404. For example, the distal end stop 416 may include angular distal ends of the first and second end effector elements 407, 408 that contact each other as the end effector 404 is moved into the third configuration by moving proximal ends of the first and second end effector elements 407, 408 away from each other, thereby inhibiting the end effector 404 from being opened any further. In some embodiments, the distal end stop member 416 may be configured to limit articulation of the first and second end effector elements 407, 408 about their respective distal ends to an angle α of less than 180 degrees. Thus, the distal end stop member 416 limits the maximum angle that the end effector elements 408 and 407 can open, for example, to ensure proper alignment. This may beneficially facilitate positioning of the end effector 404 in a desired orientation in the first and second configurations, as described herein.

Figure 7A:
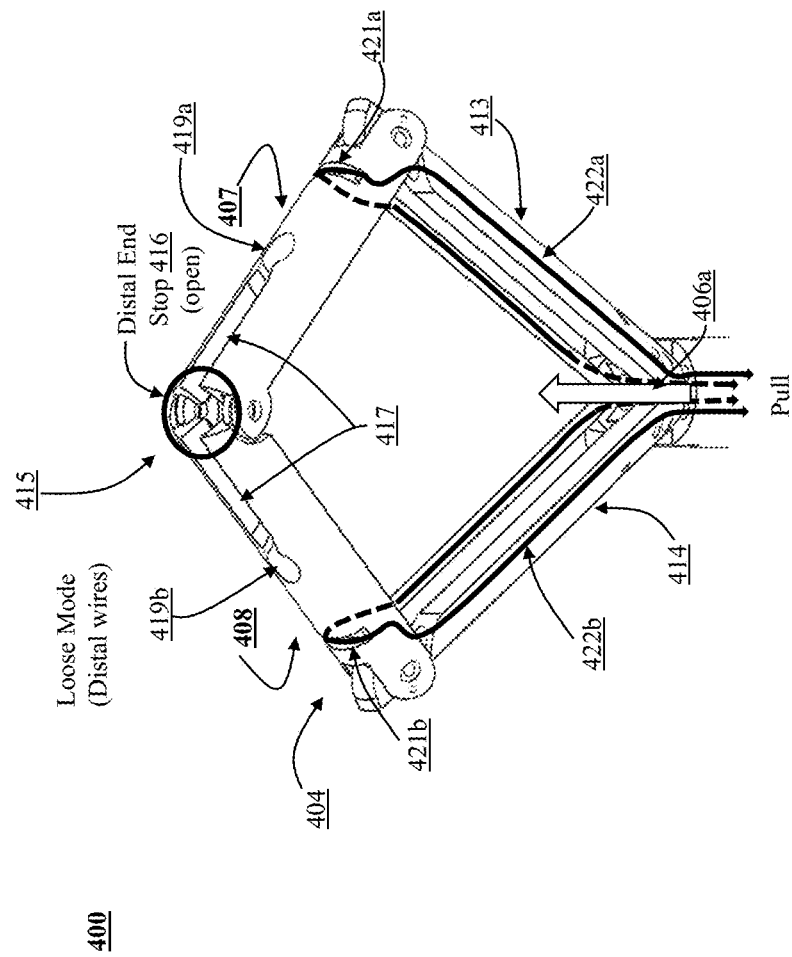
Figure 7B:
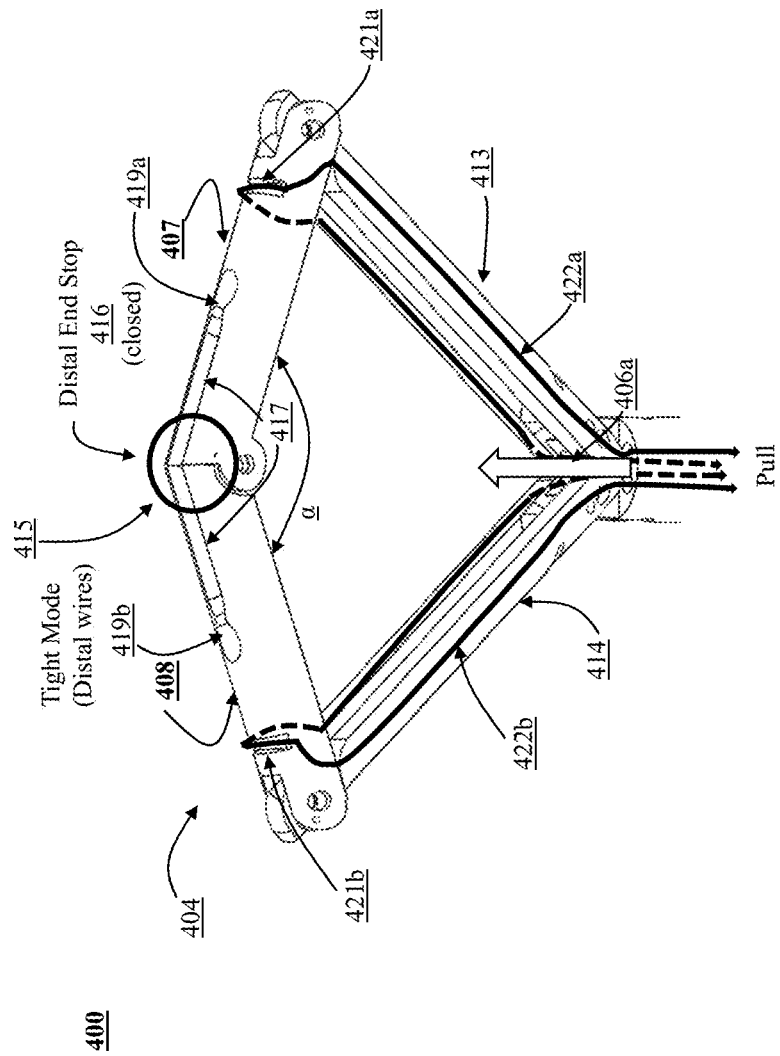
Figure 8A:
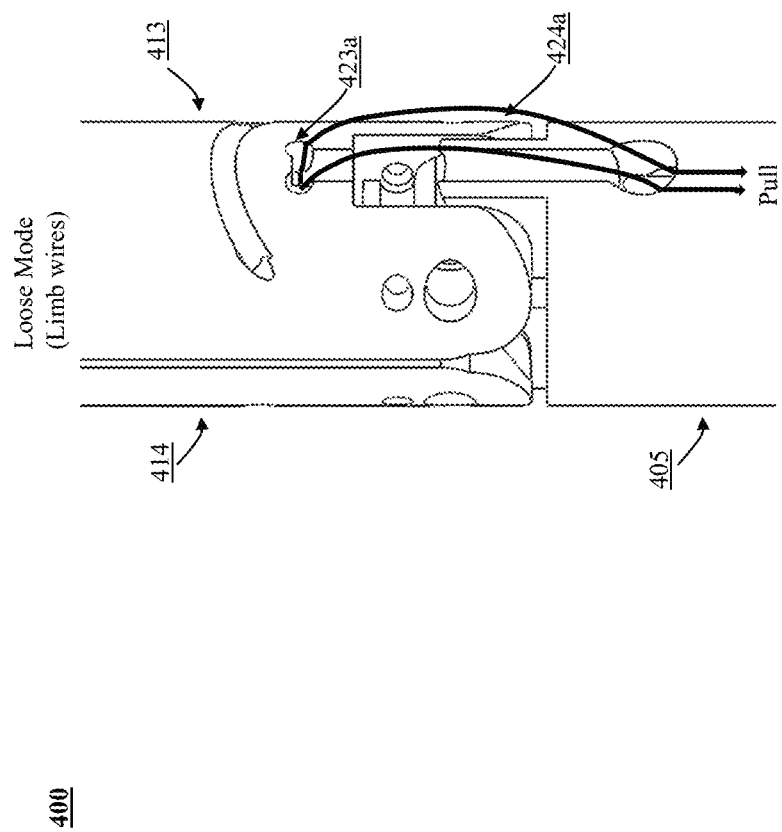
FIG. 8A shows a perspective view of a portion of the apparatus of FIG. 6 showing second actuators configured to move the end effector of the apparatus between various angular orientations, according to an embodiment.
Figure 8B:
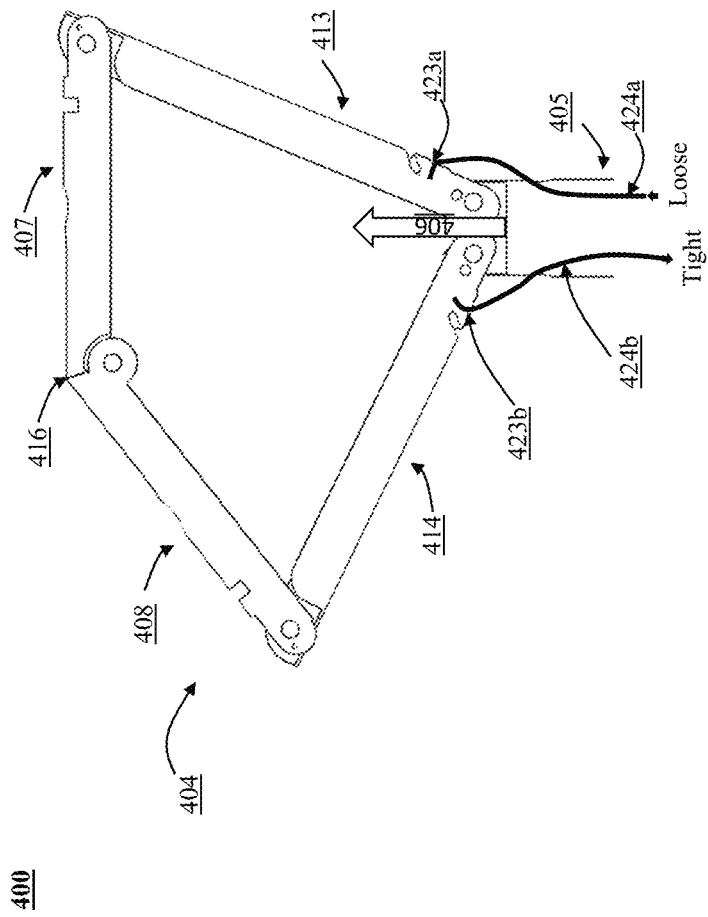
FIG. 8B shows the end effector of FIG. 6 in a first angular orientation.

FIG. 8A-8B further describes the apparatus 400 shown in FIG. 6 and FIG. 7A-7B by illustrating various mechanical features. The apparatus 400 can be cycled through different modes by moving the distal components so that they sit more proximally. This is done in this embodiment with wires that when pulled proximally decrease the distance between the proximal components, 407, 408, 413, 414, and 415. FIG. 7B displays the same embodiment after pulling on the wires, showing the decrease in distance of the end effector elements 407, 408 as well as mating of the distal end stop 416.

FIGS. 8A-8B show second actuators 424a/b that are coupled to the first and second articulation members 413, 414, and may include tethers or wires (also referred to herein as "distal stop wires 424a/b"). For example, as shown in FIGS. 8A-8B, the second actuators 424a/b are coupled to first slots 423a/b defined proximate to the proximal ends of the first and second articulation members 413, 414, respectively. The distal end stop wires 424a/b are the wires found most distally, these wires pull first and second articulation members 413, 414. When pull force is applied to the distal end stop wires 424a/b, the movement output is dependent on which wire is being pulled and the wires may move an equal distance in opposite directions (L=R) configured to cause a seesaw like movement of the end effector 404. For example, pulling the second actuator 424b while letting the second actuator 424a, moves the end effector 404 into the first configuration shown in FIG. 8B, and vice versa.

Figure 9A:
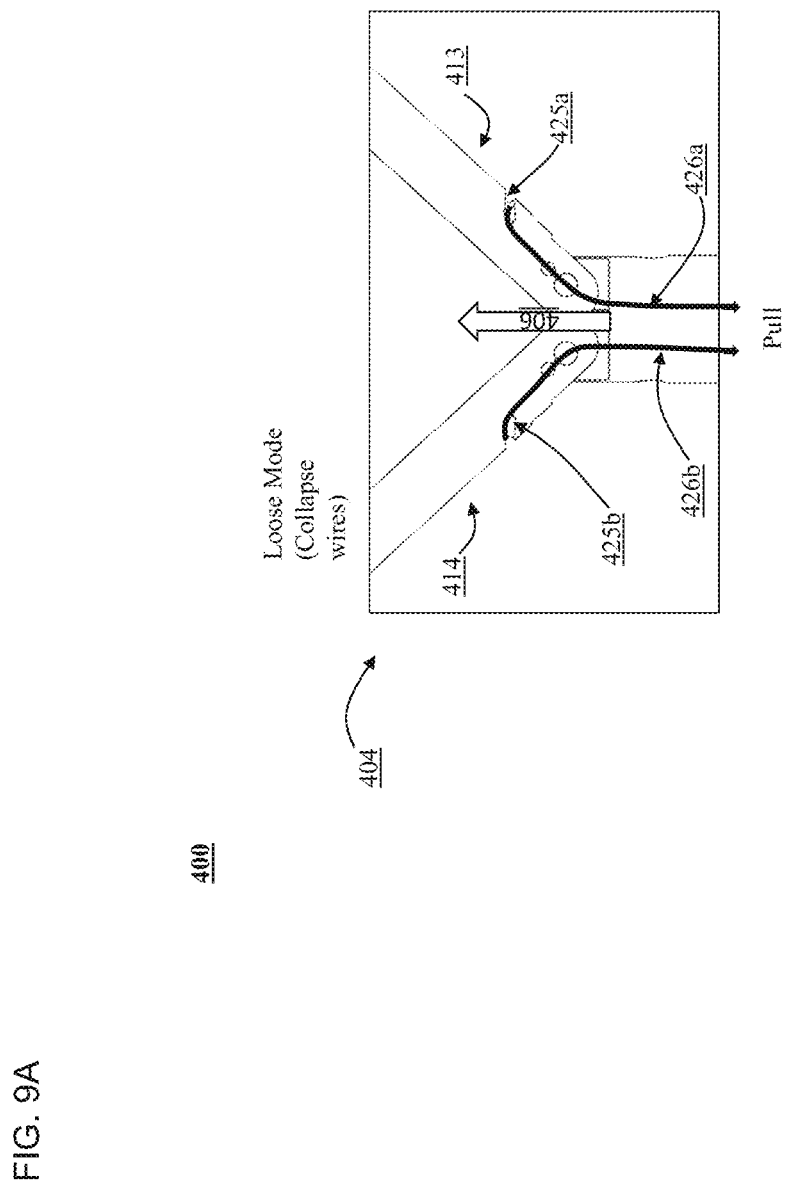
FIG. 9A shows a side view of a portion of the apparatus of FIG. 6 illustrating third actuators configured to move the end effector of the apparatus from an open configuration to a closed configuration, according to an embodiment.

FIGS. 9A-9D, show third actuators 426a/b (also referred to herein as "collapse mode wires 426a/b") that are coupled to the first and second articulation members 413, 414, and configured to collapse the first and second end effectors 407, 408 to move the end effector 404 into the third configuration. The third actuators 426a/b may are shown as including tethers or wires, but may include any other actuators as described herein. As shown in FIG. 9A, distal ends of the collapse mode wires 426a/b are coupled to second slots 425a, 425b defined on the first and second articulation members 413, 414, respectively. The second slots 425a/b may be defined on the first and second articulation members 413, 414 at a location that is distal to the first slots 423a/b, but in other implementations may be located at any suitable location on the first and second articulation members 413, 414.

The collapse mode wires 426a/b can exert a pull force on first and second articulation members 413, 414 to cause the distal ends of the first and second articulation members 413, 414 to articulate towards each other, thereby causing the first and second end effector elements 407, 408 to return to a collapsed state when the first and second end effector elements 407, 408 are in any other mode (e.g., the first or second configuration, or any other orientation). When the pull force is applied to the collapse mode wires 426a/b, the movement output is independent, (LR), meaning that the act of pulling one side, either left or right, does not necessarily affect the opposing side in this embodiment. The second actuators 424a/b exert pull forces on first and second articulation members 413, 414 and allow for these components to sway more left or more right depending on if the left or the right second actuator 424a/b has more pull force exerted on it, thus creating a seesaw affect as previously described, (L=R). FIG. 8A-8B highlight the second actuators 424a/b. In FIG. 8A, the end effectors 407, 408 are in collapsed mode prior to exerting pull force on the second actuators 424a, 424b. As a result, when pull force is exerted on the left side second actuator 424b (ON), second articulation member 414 articulates radially outwards, and first articulation member 413 articulates radially inwards causing the first end effector element 407 to be moved into a perpendicular position in respect to elongate body 405. This is similarly true if pull force is exerted on the right side second actuator 424a, which would cause the second end effector element 408 would to be oriented perpendicular to the elongate body 405.

FIG. 9A-9D highlight the collapse mode wires 426a/b. In FIG. 9A, first and second articulation members 413, 414 are in the middle cage configuration prior to exerting pull force on the collapse made wires 426a/b. As a result, when pull force is exerted on the both the right and left collapse mode wires 426a/b (ON), in inward biasing force is exerted on the first and second articulation members 413, 414, thereby causing the first and second end effector elements 407, 408 to close the end effector 404 and cause the end effector 404 to be moved into the collapsed cage configuration, as shown in FIGS. 9B-9D.

Figure 10A:
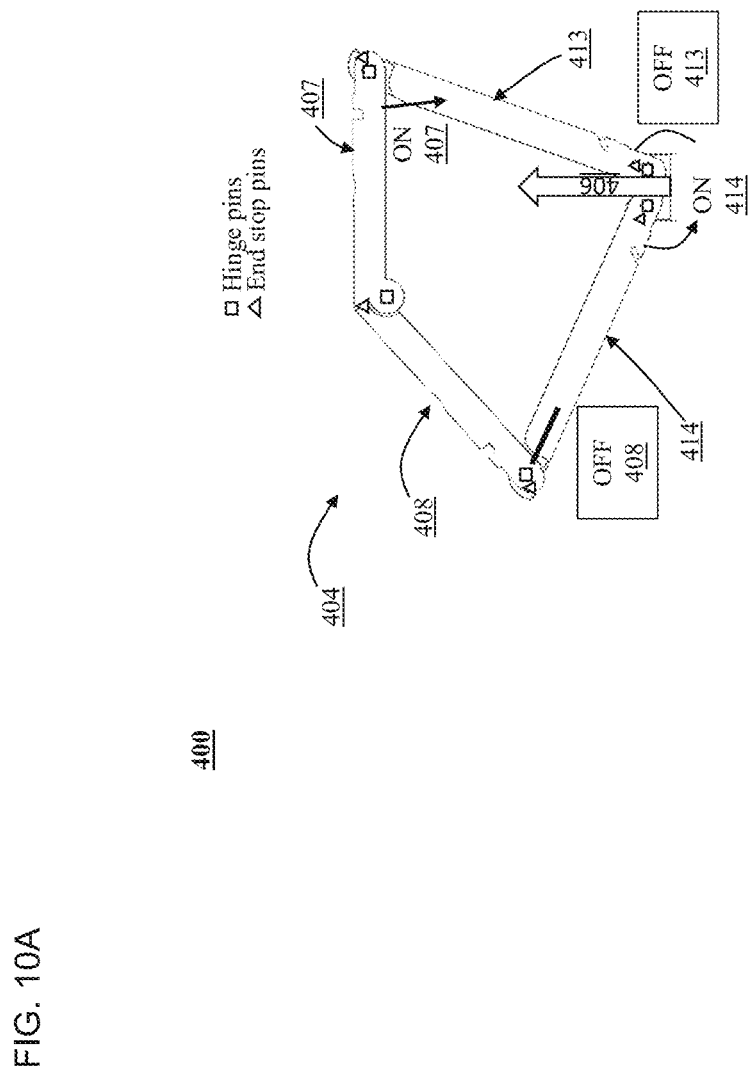
FIGS. 10A-10C show side views of the end effector of the apparatus of FIG. 6 in a first configuration (FIG. 10A), a second configuration (FIG. 10C), and an angular orientation between the first and second configurations (FIG. 10B).
Figure 10B:
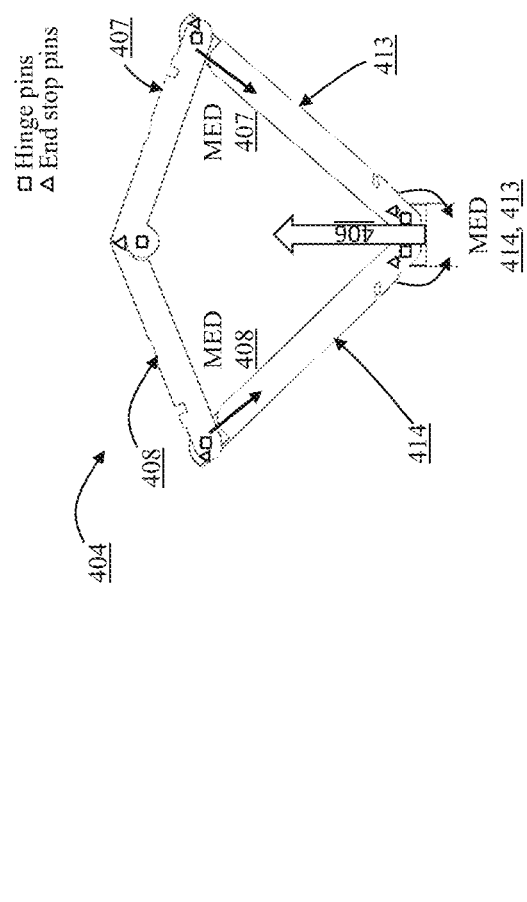
Figure 10C:
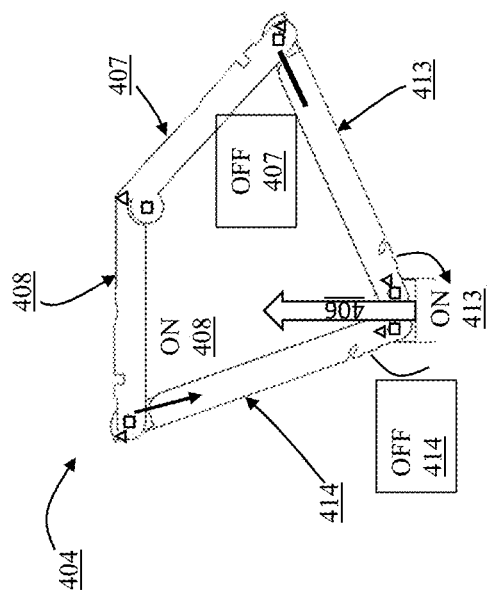
Figure 11:
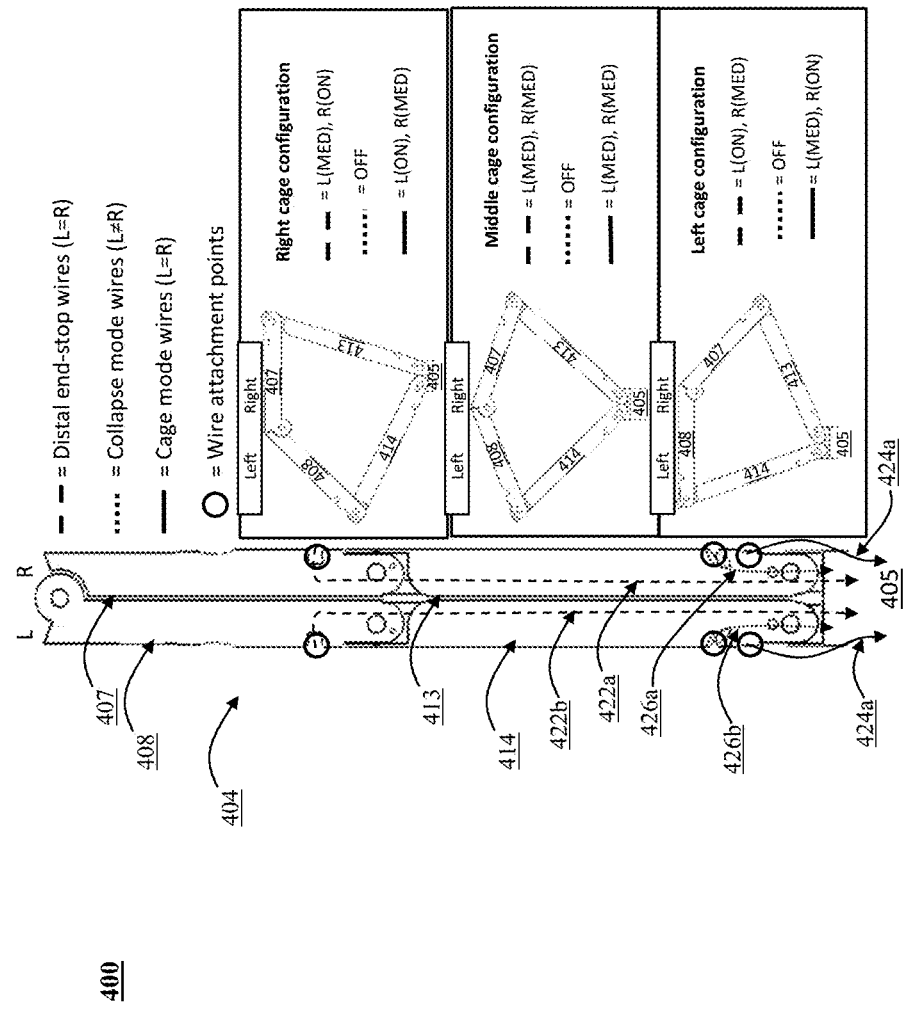
FIG. 11 shows the end effector of the apparatus of FIG. 6 in various angular orientations, facilitated by the first, second, and third actuators.

FIG. 10A-10C illustrate the concept of the different cage configurations in more detail. FIG. 10A shows, the end effector 404 in a first configuration (right cage configuration), FIG. 10C shows the end effector 404 in the second configuration (left cage configuration), and FIG. 10C shows the end effector 404 in between the first and second configuration (middle cage configuration). Arrows depict the end effector elements 407, 408 and/or articulation members 413, 414 that are experiencing pull force. In FIGS. 10A-10C, lines without arrow heads depict the end effector elements 407, 408 and the articulation members 413, 414 that are not experiencing pull force. In some embodiments, the end effector 404 may also include hinge pins disposed at proximal and distal ends the first and second articulation members 413, 414, and the first and second end effector elements 407, 408 for coupling the first and second end effector elements 413, 414 to the elongate body 405, coupling distal ends of the first and second end articulation members 413, 414 to the proximal ends of the first and second end effector elements 407, 408, and coupling distal ends of the first and second end effector elements 407, 408 to each other, for example, via the distal articulation member 415. In some embodiments, the end effector 404 may also include end stop pins disposed at any suitable locations on the end effector 404. The end stop pins may be configured to limit angular motion or displacement of the first and second end effector elements 407, 408 and/or the first and second articulation members 413, 414. This may advantageously prevent the end effector 404 to be moved into an orientation in the cage configuration in which the collapse mode wires 426a/b are unable to cause the end effector 404 to be moved into the collapsed configuration. FIG. 11 shows various of the end effector 404 in the right cage, middle cage, and left cage configuration, and the first actuators 422a/b, second actuators 424a/b, and/or third actuators 426a/b that are actuated to achieve each of these configurations.

Figure 12A:
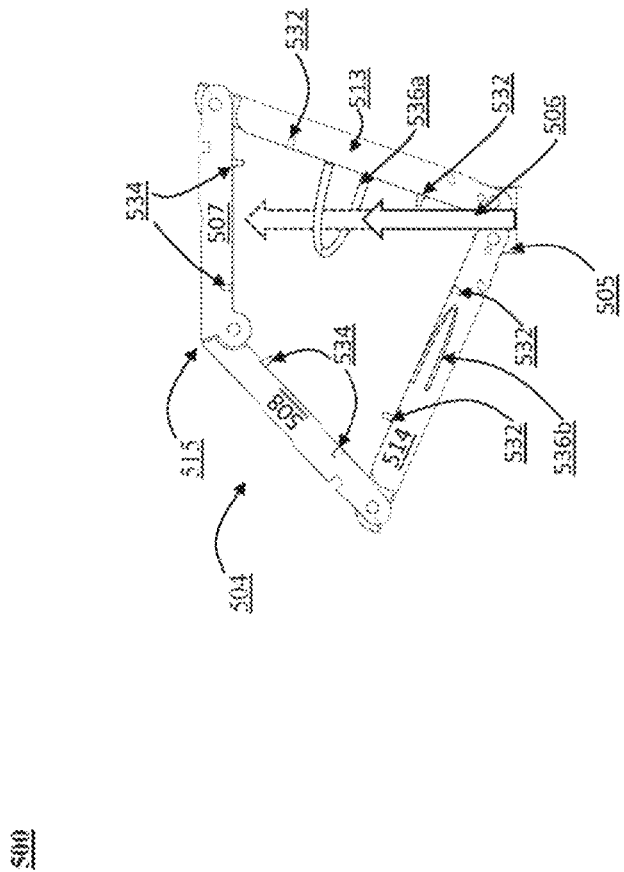
FIGS. 12A-12C show side views of an end effector that includes alignment features and alignment members, according to an embodiment.
Figure 12B:
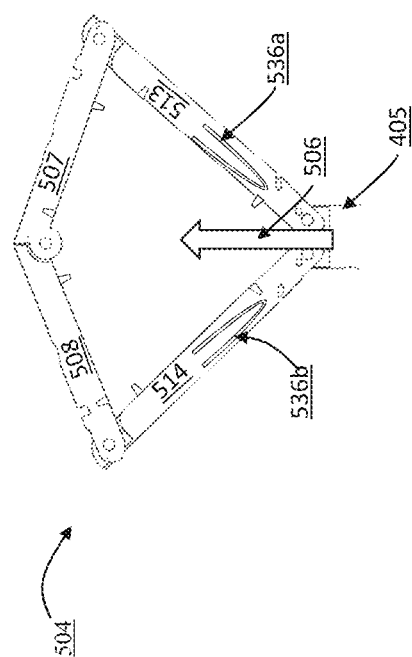
Figure 12C:
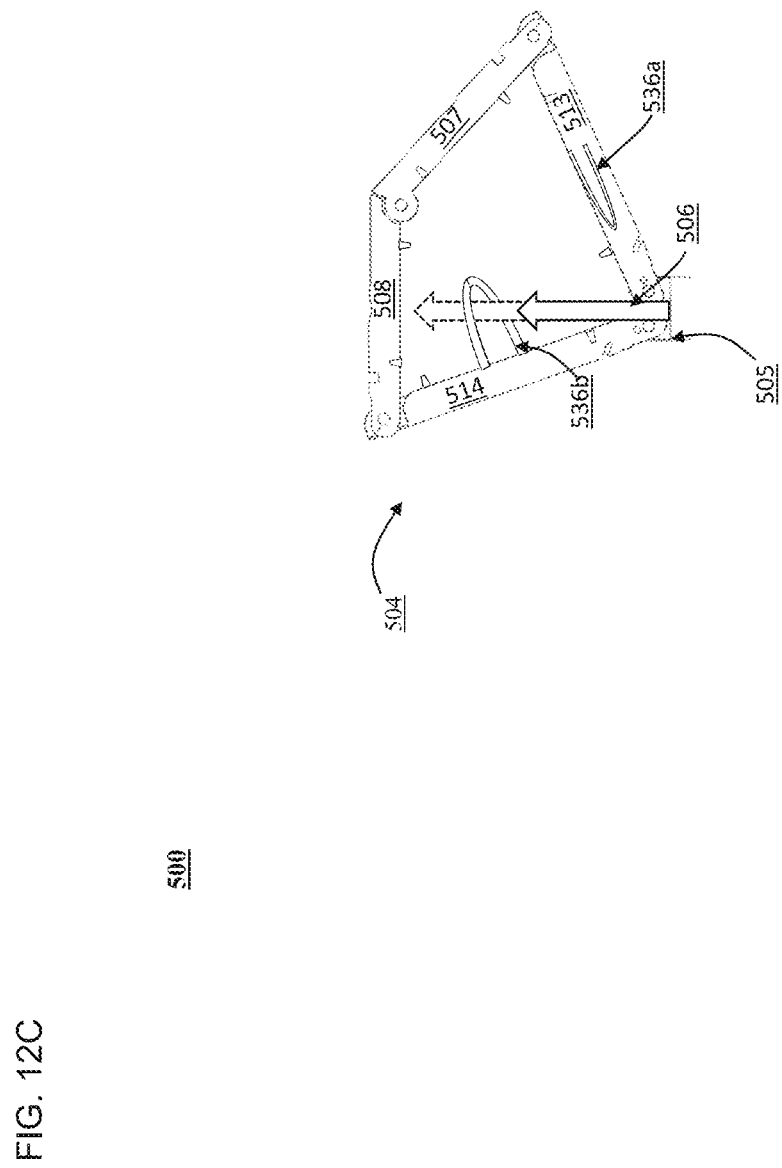

FIG. 12A-12C show perspective views of an apparatus 500, according to another embodiment. The apparatus 500 is substantially similar to the apparatus 400 previously described herein, and includes an elongate body 505, a vessel actuator 506 disposed through the elongate body 505, and an end effector 504 that includes a first end effector element 507, a second end effector element 508, a first articulation member 513, a second articulation member 514, a distal articulation member 515, which are substantially similar in structure and function to the elongate body 405, the vessel actuator 405, the first end effector element 407, the second end effector element 408, the first articulation member 413, the second articulation member 414, and the distal articulation member 415, previously described herein.

Different from the apparatus 400, the end effector 504 of the apparatus 500 includes further alignment features for aligning the first and second end effector elements 507, 508, as well as first and second articulation members 513, 514 for proper closure in the third configuration, and for axially aligning the vessel actuator 506 with the first or second coupler elements (e.g., the first and second coupler elements 211, 212) in the first and second configuration. For example, as shown in FIGS. 12A-12C, the first and second articulation members 513, 514 include first alignment features 532 (e.g., pins, protrusion, indents, detents, slots, cavities, etc.), and the first and second end effector elements 507, 508 include second alignment features 534 (e.g., pins, protrusion, indents, detents, slots, cavities, etc.) that are configured to mate with corresponding first alignment features 532. The first and second alignment features 532 are configured to facilitate properly aligned closure of the end effector elements 507, 508, and first and second articulation members 513 and 514 when in the collapse state configuration, i.e., the third configuration. In this manner, the first and second alignment features 532, 534 facilitate alignment and coaptation of the first coupler element coupled to the first end effector element 507 with the second coupler element coupled to the second end effector element 508 in the third configuration.

The end effector 504 also includes a first end effector alignment member 536a disposed on the first articulation member 513 and configured to align the vessel actuator 506 with the first coupler element in the first configuration, and a second end effector alignment member 536b disposed on the second articulation member 514 and configured to align the vessel actuator 506 with the second coupler element in the second configuration. First and second end effector alignment members 536a, 536b may facilitate the vessel actuator 406 in traveling upwards while maintaining axial alignment relative to first or second end effector element 407, 408 depending on the cage configuration. In some embodiments, the first and second end effector alignment members 536a/b may include ring or arch shaped structures coupled to inner surfaces of the first and second articulation members 513, 514. The first and second end effector alignment members 536a/b define an aperture therethrough through which the vessel actuator 506 is inserted for accessing the corresponding coupler element. When the vessel actuator 506 is inserted through the first or second end effector alignment members 536a/b, inner surfaces of the first or second end effector alignment members 536a/b in the first or second configuration, respectively, may contact outer surface of the vessel actuator 506, and inhibit lateral movement of the vessel actuator 506 to maintain alignment of the vessel actuator 506 with the corresponding first or second coupler element. The first and second end effector alignment members 536a/b may be configured to be collapsible, for example, in the third configuration to allow the end effector 504 to close. In some embodiments, the first end effector alignment member 536a may be configured to move from a collapsed to a deployed configuration in the first configuration, and the second end effector alignment member 536b may be collapsed in the first configuration, as shown in FIG. 12A. Both the first and second end effector elements 536a/b may be collapsed in the middle cage configuration, as shown in FIG. 12B. Moreover, the second end effector alignment member 536b may be configured to move from a collapsed to a deployed configuration in the second configuration, and the first end effector alignment member 536b may be collapsed in the second configuration, as shown in FIG. 12C.

In some embodiments, any of the end effectors described herein may be configured to articulate about the distal end of the elongate body or shaft assembly by an angle in a range of at least about 20 degrees (e.g., about 20, 40, 60, 80, 90, 100, 110, or 120 degrees, inclusive of all values and subranges therebetween). This may increase the visibility of the various elements critical to performing an anastomosis procedure.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially' and similar terms are intended to have a broad meaning in harmony with the common and accepted usage by those of ordinary skill in the art to which the subject matter of this disclosure pertains. For example, the term "substantially flat" would mean that there may be de minimis amount of surface variations or undulations present due to manufacturing variations present on an otherwise flat surface. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable, or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes, and omissions may also be made in the design, operating conditions, and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus, comprising:
an elongate body; and
an end effector coupled to a distal end of the elongate body, the end effector including:
a first end effector element defining a first receptacle configured to hold a first coupler element of a coupler,
a first articulating member coupling a proximal end of the first end effector element to the elongate body,
a second end effector element defining a second receptacle configured to hold a second coupler element of the coupler,
a second articulating member coupling a proximal end of the second end effector element to the elongate body, and
wherein the end effector is configured to move between:
(i) a first configuration in which the first and second articulating members dispose the first and second end effector elements to allow a first axial end of a first vessel to be received into the first coupler element; (ii) a second configuration different from the first configuration in which the first and second articulating members dispose the first and second end effector to allow a second axial end of a second vessel to be received into the second coupler element; and (iii) a third configuration in which the first and second articulating members dispose at least a portion of the first end effector element proximate to a corresponding portion of the second end effector element such that the first coupler element is coupled to the second coupler elements to couple the first vessel to the second vessel.

2. The apparatus of claim 1, wherein:
in the first configuration, at least a portion of the first end effector is nearly perpendicular to the axis of the elongate body, and in the second configuration, at least a portion of the second end effector is nearly perpendicular to the axis of the elongate body.

3. The apparatus of claim 2, wherein:
in the first configuration, an aperture of the first coupler element is nearly axially aligned with the elongate body, and
in the second configuration, an aperture of the second coupler element is nearly axially aligned with the elongate body.

4. The apparatus of claim 1, further comprising:
a vessel actuator disposed through an inner channel defined by the elongate body, and configured to be axially displaced through the inner channel to protrude through the end effector.

5. The apparatus of claim 4, wherein the vessel actuator is configured to cause the axial end of the first vessel to be received into the first coupler element in the first configuration, and to cause the axial end of the second vessel to be received into the second coupler element in the second configuration.

6. The apparatus of claim 4, further comprising:
a first end effector alignment member disposed on the first articulation member and configured to align the vessel actuator with the first coupler element in the first configuration; and
a second end effector alignment member disposed on the second articulation member and configured to align the vessel actuator with the second coupler element in the second configuration.

7. The apparatus of claim 4, wherein:
each of the first end effector element and the second end effector element define a channel through at least a portion thereof, and vin the third configuration, the vessel actuator is configured to selectively translate along an axis of the interior channels to push the first and second coupler elements and thereby, the first and second vessels out of the respective first and second receptacles.

8. The apparatus element of claim 1, wherein:
the first and second articulation members include first alignment features,
the first and second end effector elements include second alignment features, and
the first and second alignment features are configured to facilitate alignment and coaptation of the first coupler element with the second coupler element in the third configuration.

9. The apparatus of claim 1, further comprising:
a distal articulating member coupled to distal ends of the first end effector and the second end effector, the distal articulating member configured to allow the distal ends of the first and second end effector elements to articulate about each other.

10. The apparatus of claim 9, wherein:
the distal articulating member defines an opening in the third configuration that is continuous with the first and second receptacles, the opening configured to allow the first and second coupler elements to be displaced from the first and second receptacles therethrough to release the coupler from the end effector.

11. The apparatus of claim 10, wherein the distal articulating member includes a distal end stop member configured to limit articulation of the first and second end effector elements about their respective distal ends to an angle of less than 180 degrees.

12. The apparatus of claim 9, wherein the distal articulating member is configured to further allow the first and second end effector elements to translate towards or away from each other in the third configuration.

13. The apparatus of claim 1, wherein proximal ends of the first and second articulating members are configured to translate relative to the elongate body.

14. The apparatus of claim 1, further comprising:
a first actuators coupled to the first and second end effector elements, the first actuators configured to be engaged to cause the first and second end effector elements to articulate away from each other about their respective distal ends.

15. The apparatus of claim 14, further comprising:
second actuators coupled to the first and second articulation members at first locations thereof,
wherein:
the second actuator coupled to the second articulation member is configured to be
displaced towards the elongate body to move the end effector into the first configuration, and
the second actuator coupled to the first articulation member is configured to be displaced towards the elongate body to move the end effector into the second configuration.

16. The apparatus of claim 15, further comprising:
third actuators having a first distal end coupled the first and second articulating members at second locations thereof different from the first locations,
wherein the third actuators are configured to be engaged to move the end effector into the third configuration from first or the second configuration.

17. The apparatus of claim 16, wherein at least one of the first actuators, the second actuators, or the third actuators include tethers.

18. The apparatus of claim 1, wherein the end effector is also configured to move into an intermediate configuration in which at least the portion of first end effector element is proximate to the corresponding portion of the second end effector element but with a gap therebetween such that the first coupler element is not coupled to the second coupler element.

19. An apparatus, comprising:
a first end effector element defining a first receptacle configured to hold a first coupler element of a coupler;
a first articulating member coupling a proximal end of the first end effector element to an elongate body;
a second end effector element defining a second receptacle configured to hold a second coupler element of the coupler, a distal end of the second end effector element coupled to a distal end of the first end effector element such that the first and second effector elements can articulate about their respective distal ends; and
a second articulating member coupling a proximal end of the second end effector element to the elongate body,
wherein the end effector is configured to move between:
(i) a first configuration in which the first and second articulating members dispose the first and second end effector elements to allow a first axial end of a first vessel to be received into the first coupler element; (ii) a second configuration different from the first configuration in which the first and second articulating members dispose the first and second end effector to allow a second axial end of a second vessel to be received into the second coupler element; and (iii) a third configuration in which the first and second articulating members dispose at least a portion of the first end effector element proximate to a corresponding portion of the second end effector element such that the first coupler element is coupled to the second coupler elements to couple the first vessel to the second vessel.

20. The apparatus of claim 19, wherein:
in the first configuration, at least a portion of the first end effector is configured to be disposed nearly perpendicular to an axis of the elongate body, and
in the second configuration, at least a portion of the second end effector is configured to be disposed nearly perpendicular to the axis of the elongate body.

21. The apparatus of claim 20, wherein:
in the first configuration, the first receptacle of the first coupler element is configured to be nearly axially aligned with the elongate body, and
in the second configuration, the second receptacle of the second coupler element is configured to be nearly axially aligned with the elongate body.

22. The apparatus of claim 19, wherein each of the first end effector element and the second end effector element define a channel through at least a portion thereof, each of the channels configured to axially receive a portion of a vessel actuator therethrough in the third configuration to enable vessel actuator to cause the first coupler element and the second coupler element, and thereby, the first vessel and the second vessel coupled thereto, respectively, to be released from the end effector.

23. The apparatus of claim 19, further comprising:
a distal articulating member coupled to distal ends of the first end effector and the second end effector, the distal articulating member configured to allow the distal ends of the first and second end effector elements to articulate about each other.

24. The apparatus of claim 23, wherein:
the distal articulating member defines an opening in the third configuration that is continuous with the first and second receptacles, the opening configured to allow the first and second coupler elements to be displaced from the first and second receptacles therethrough to release the coupler from the end effector.

25. The apparatus of claim 24, wherein the distal articulating member includes a distal end stop member configured to limit articulation of the first and second end effector elements about their respective distal ends to an angle of less than 180 degrees.

26. The apparatus of claim 19, further comprising:
a first end effector alignment member disposed on the first articulation member and configured to align a vessel actuator with the first coupler element in the first configuration; and
a second end effector alignment member disposed on the second articulation member and configured to align a vessel actuator with the second coupler element in the second configuration.

27. The apparatus of claim 19, wherein:
the first and second articulation members include first alignment features,
the first and second end effector elements include second alignment features, and
the first alignment features are configured to facilitate coaptation of the first coupler element with the second coupler element in the third configuration.

28. The apparatus of claim 19, wherein the end effector is also configured to move into an intermediate configuration in which at least the portion of first end effector element is proximate to the corresponding portion of the second end effector element but with a gap therebetween such that the first coupler element is not coupled to the second coupler element.

29. A method for anastomosis of a first vessel with a second vessel within a body of a patient, comprising:
inserting a distal end of an elongate body of an apparatus into the body of the patient, an end effector coupled to the distal end of the elongate body, the end effector including a first end effector element coupled to the elongate body via a first articulating member, and a second end effector element coupled to the elongate body via a second articulating member;
moving the end effector into a first configuration in which at least a portion of the first end effector is nearly perpendicular to the axis of the elongate body;
inserting an axial end of the first vessel through a first coupler element coupled to the first end effector element;
moving the end effector into a second configuration in which at least a portion of the second end effector element is nearly perpendicular to the axis of the elongate body;
inserting an axial end of the second vessel through a second coupler element coupled to the second end effector element;
moving the end effector into a third configuration to cause at least the portion of the first end effector element to move proximate to the corresponding portion of the second end effector element to couple the first coupler element to the second coupler element, thereby coupling the first vessel to the second vessel; and
releasing the first coupler element from the first end effector element and the second coupler element from the second end effector element.

30. The method of claim 29, further comprising:
disposing the first coupler element into a first receptacle of the first end effector element; and
disposing a second coupler element into a second receptacle of the second end effector element.

31. The method of claim 29, further comprising:
after inserting the axial end of the first vessel through the first coupler element, everting the axial end of the first vessel to couple the axial end of the first vessel to the first coupler element; and
after inserting the axial end of the second vessel through the second coupler element, everting the axial end of the second vessel to couple the axial end of the second vessel to the second coupler element.

32. The method of claim 29, further comprising:
prior to inserting the elongate body into the body of the patient, ligating the first vessel; and
ligating the second vessel.

33. The method of claim 29, further comprising:
prior to inserting a distal end of the elongate body into the body of the patient, move the end effector into an intermediate configuration in which at least the portion of first end effector element is proximate to the corresponding portion of the second end effector element but with a gap therebetween such that the first coupler element is not coupled to the second coupler element.

34. A method for anastomosis, the method comprising:
transitioning, after an end effector of an anastomosis device has been positioned into a body of a patient, the end effector to a first configuration;
receiving, when the end effector is in the first configuration, an axial end of a first vessel through a first coupler element mounted to a first portion of the end effector;

transitioning the end effector to a second configuration different from the first configuration;

receiving, when the end effector is in the second configuration, an axial end of a second vessel through a second coupler element mounted to a second portion of the end effector;

transitioning the end effector into a third configuration in which at least the first portion of the end effector is positioned proximate to the second portion of the end effector to couple the first coupler element to the second coupler element, thereby coupling the first vessel to the second vessel; and releasing the first and second coupler elements from the end effector.

35. The method of claim 34, wherein:

transitioning into the first configuration includes orienting the first portion of the end effector nearly perpendicular to an elongate body coupled to the end effector, and transitioning into the second configuration includes orienting the second portion of the end effector nearly perpendicular to the elongate body.

36. The method of claim 34, further comprising:

activating, after inserting the axial end of the first vessel through the first coupler element, a vessel actuator to evert the axial end of the first vessel to couple the axial end of the first vessel to the first coupler element; and activating, after inserting the axial end of the second vessel through the first coupler element, the vessel actuator to evert the axial end of the second vessel to couple the axial end of the second vessel to the second coupler element.

37. The method of claim 34, further comprising:

transitioning, prior to positioning the end effector into the body of the patient, the end effector into an intermediate configuration in which at least the portion of first end effector element is proximate to the corresponding portion of the second end effector element but with a gap therebetween such that the first coupler element is not coupled to the second coupler element.

* * * * *